US007328886B2

(12) United States Patent
Mockry et al.

(10) Patent No.: US 7,328,886 B2
(45) Date of Patent: Feb. 12, 2008

(54) AIR-TO-AIR ATMOSPHERIC HEAT EXCHANGER FOR CONDENSING COOLING TOWER EFFLUENT

(75) Inventors: Eldon F. Mockry, Lenexa, KS (US); Jason Stratman, Lee's Summit, MO (US); Jidong Yang, Overland Park, KS (US); Mark Anthony Johnson, Overland Park, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 490 days.

(21) Appl. No.: 10/930,847

(22) Filed: Sep. 1, 2004

(65) Prior Publication Data

US 2005/0077637 A1 Apr. 14, 2005

Related U.S. Application Data

(63) Continuation-in-part of application No. 10/689,691, filed on Oct. 22, 2003, now Pat. No. 7,128,310, which is a continuation-in-part of application No. 09/973,732, filed on Oct. 11, 2001, now Pat. No. 6,663,694, which is a continuation-in-part of application No. 09/973,733, filed on Oct. 11, 2001, now Pat. No. 6,663,087.

(51) Int. Cl.
*B01D 53/26* (2006.01)
*F28C 1/14* (2006.01)
*F28C 1/16* (2006.01)
*F28F 3/00* (2006.01)
*F28D 9/00* (2006.01)

(52) U.S. Cl. .................. 261/112.1; 261/110; 261/152; 261/155; 261/157; 261/161; 261/DIG. 3; 261/DIG. 11; 261/DIG. 77; 165/165; 165/166; 165/167; 165/900; 165/DIG. 182; 165/DIG. 185; 165/DIG. 356; 165/DIG. 357; 165/DIG. 382; 165/DIG. 384

(58) Field of Classification Search ................ 261/110, 261/111, 115, 117, 118, 152, 153, 154, 155, 261/156, 157, 160, 161, 112.1, DIG. 3, DIG. 11, 261/DIG. 77, DIG. 86, DIG. 87; 165/164, 165/165, 166, 167, 900, DIG. 182, DIG. 185, 165/DIG. 356, DIG. 373, DIG. 382, DIG. 383, 165/DIG. 384; 95/288

See application file for complete search history.

(56) References Cited

U.S. PATENT DOCUMENTS

| | | | | |
|---|---|---|---|---|
| 2,957,679 | A * | 10/1960 | Campbell | 165/148 |
| 3,079,994 | A * | 3/1963 | Kuehl | 165/166 |
| 3,792,572 | A | 2/1974 | Turbin | 55/269 |
| 3,995,689 | A | 12/1976 | Cates | 165/166 |
| 4,076,771 | A | 2/1978 | Houx, Jr. et al. | 261/159 |
| 4,099,928 | A | 7/1978 | Norback | 29/157.3 |
| 4,119,140 | A * | 10/1978 | Cates | 261/DIG. 11 |
| 4,184,542 | A * | 1/1980 | Sumitomo | 165/166 |
| 4,374,542 | A * | 2/1983 | Bradley | 165/166 |
| 4,378,837 | A | 4/1983 | Ospelt | 165/166 |
| 4,556,105 | A | 12/1985 | Boner | 165/165 |
| 4,706,741 | A * | 11/1987 | Bolmstedt et al. | 165/166 |
| 4,724,902 | A * | 2/1988 | Gross | 165/166 |
| 4,781,248 | A * | 11/1988 | Pfeiffer | 165/166 |
| 4,854,382 | A * | 8/1989 | Funke | 165/166 |
| 4,858,685 | A * | 8/1989 | Szucs et al. | 165/166 |
| 4,915,165 | A * | 4/1990 | Dahlgren et al. | 165/166 |
| 5,069,276 | A * | 12/1991 | Seidel | 165/166 |
| 5,398,751 | A * | 3/1995 | Blomgren | 165/166 |
| 5,525,236 | A | 6/1996 | Wilkinson | 210/651 |
| 5,638,898 | A | 6/1997 | Gu | 165/160 |
| 5,775,410 | A * | 7/1998 | Ramm-Schmidt et al. | 165/166 |
| 5,853,549 | A | 12/1998 | Sephton | 203/2 |
| 5,944,094 | A | 8/1999 | Kinney, Jr. et al. | 165/166 |
| 6,070,655 | A | 6/2000 | Heikklla | 165/111 |
| 6,070,658 | A * | 6/2000 | Cipriani | 165/166 |
| 6,161,615 | A * | 12/2000 | Brieden et al. | 165/166 |
| 6,247,682 | B1 | 6/2001 | Vouche | 261/152 |
| 6,254,734 | B1 | 7/2001 | Sephton | 203/2 |
| 6,260,830 | B1 | 7/2001 | Harrison et al. | 261/112.2 |
| 6,340,053 | B1 * | 1/2002 | Wu et al. | 165/167 |

| 6,684,943 B2 * | 2/2004 | Dobbs et al. | 165/166 |

OTHER PUBLICATIONS

"The Desalting ABC's" by O.K. Buros for the International Desalination Association, 1990.

Cooling Tower Institute 1993 Annual Meeting Technical Paper No. TP93-01 "Plume Abatement and Water Conservation with the Wet/Dry Cooling Tower" by Paul A. Lindahl, Jr., et al.

"Open Multiple Effect Desalination with Low Temperature Process Heat", Baumgartner et al., International Symposium on Desalination and Water Re-Use, vol. 4, 1991.

"Zero Discharge Desalination", Lu et al, Proceedings from the ADA North American Biennial Conference and Exposition, Aug. 2000.

* cited by examiner

Primary Examiner—Jason M. Greene
(74) Attorney, Agent, or Firm—Baker & Hostetler LLP

(57) ABSTRACT

A sheet for use in a heat exchange apparatus. The sheet includes a first vertical rib that extends in a first direction generally parallel to the vertical axis of the heat exchange apparatus, wherein said first vertical rib protrudes in a second direction out of the plane. The sheet also includes a second vertical rib that extends in the first direction along the sheet, substantially all the way between the first and second edges of the sheet generally parallel to the first vertical rib. The second vertical rib also protrudes in the second direction out of the plane. The sheet further includes a first horizontal rib that extends in a third direction along the sheet substantially all the way between the third and fourth edges of the sheet, wherein the first horizontal rib protrudes in a fourth direction opposite said second direction. The sheet additionally includes a second horizontal rib that extends in the third direction along the sheet substantially all the way between the third and fourth edges of the sheet generally parallel to the first horizontal rib. The second horizontal rib protrudes in a fourth direction opposite the second direction, into the plane and intersects said second vertical rib.

25 Claims, 29 Drawing Sheets

Cooling Tower High Efficiency Mode

Plume Abatement and Water Conservation Mode

Plume Abatement and Water Conservation Mode

Cooling Tower High Efficiency Mode

AIR-TO-AIR ATMOSPHERIC HEAT EXCHANGER FOR CONDENSING COOLING TOWER EFFLUENT

PRIORITY

This application is a continuation-in-part, and claims the benefit of, U.S. patent application Ser. No. 10/689,691, filed Oct. 22, 2003, now issued as U.S. Pat. No. 7,128,310, entitled AIR-TO-AIR ATMOSPHERIC HEAT EXCHANGER FOR CONDENSING COOLING TOWER EFFLUENT, which is a continuation-in-part of U.S. patent application Ser. No. 09/973,732, now issued as U.S. Pat. No. 6,663,694 and U.S. patent application Ser. No. 09/973,733 now issued as U.S. Pat. No. 6,663,087, each filed Oct. 11, 2001, both entitled AIR-TO-AIR ATMOSPHERIC HEAT EXCHANGER FOR CONDENSING COOLING TOWER EFFLUENT, the disclosures of which are incorporated herein by reference.

FIELD OF THE INVENTION

The present invention relates generally to water reclamation from cooling tower effluent or other heat rejection devices. More particularly, the present invention relates to method and apparatus for reclaiming water from cooling tower effluent to provide a source of clean water, reduce water consumption of the cooling tower, and/or to reduce the cooling tower plume.

BACKGROUND OF THE INVENTION

In electricity generation using steam driven turbines, water is heated by a burner to create steam which drives a turbine to creates electricity. In order to minimize the amount of clean water necessary for this process, the steam must be converted back into water, by removing heat, so that the water can be reused in the process. In air conditioning systems for large buildings, air inside the building is forced passed coils containing a cooled refrigerant gas thereby transferring heat from inside the building into the refrigerant gas. The warmed refrigerant is then piped outside the building where the excess heat must be removed from the refrigerant so that the refrigerant gas can be re-cooled and the cooling process continued.

In both of the foregoing processes, and numerous other processes that require the step of dissipating excess heat, cooling towers have been employed. In wet type cooling towers, water is pumped passed a condenser coil containing the heated steam, refrigerant, or other heated liquid or gas, thereby transferring heat into the water. The water is then pumped to the top of the cooling tower and sprayed over a cooling tower media comprised of thin sheets of material or splash bars. As the water flows down the cooling tower media, ambient air is forced passed the heated water and heat is transmitted from the water to the air by both sensible and evaporative heat transfer. The air is then forced out of the cooling tower and dissipated into the surrounding air.

Cooling towers are highly efficient and cost effective means of dissipating this excess heat and thus are widely used for this purpose. A recognized drawback to cooling towers, however, is that under certain atmospheric conditions a plume can be created by moisture from the heated water source evaporating into the air stream being carried out of the top of the cooling tower. Where the cooling tower is very large, as in the case of power plants, the plume can cause low lying fog in the vicinity of the cooling tower. The plume can also cause icing on roads in the vicinity of the cooling tower where colder temperatures cause the moisture in the plume to freeze.

Efforts have therefore been made to limit or eliminate the plume caused by cooling towers. Examples of such efforts can be found in the following United States Patents:

U.S. Pat. No. 6,247,682 to Vouche describes a plume abated cooling tower in which ambient air, in addition to being brought in at the bottom of the tower and forced upwards through a fill pack as hot water is sprayed down on the fill pack, is brought into the cooling tower through isolated heat conductive passageways below the hot water spray heads. These passageways which are made from a heat conductive material such as aluminum, copper, etc., allow the ambient air to absorb some of the heat without moisture being evaporated into the air. At the top of the tower the wet laden heated air and the dry heated air are mixed thereby reducing the plume.

U.S. Pat. No. 4,361,524 to Howlett describes a plume prevention system in which the hot water is partially cooled before being provided into the cooling tower. The partial cooling of the hot water is performed using a separate heat exchanger operating with a separate cooling medium such as air or water. As discussed in the patent, the separate heat exchanger reduces the efficiency of the cooling tower and thus should only be employed when atmospheric conditions exist in which a plume would be created by the cooling tower.

Another example of a system designed to reduce plume in a wet type cooling tower can be found in the "Technical Paper Number TP93-01" of the Cooling Tower Institute 1993 Annual Meeting, "Plume Abatement and Water Conservation with the Wet/Dry Cooling Tower," Paul A. Lindahl, Jr., et al. In the system described in this paper, hot water is first pumped through a dry air cooling section where air is forced across heat exchange fins connected to the flow. The water, which has been partially cooled, is then sprayed over a fill pack positioned below the dry air cooling section and air is forced through the fill pack to further cool the water. The wet air is then forced upwards within the tower and mixed with the heated dry air from the dry cooling process and forced out the top of the tower.

While the foregoing systems provide useful solutions to the wet cooling tower plume problem, they all require the construction of a complex and costly wet and dry air heat transfer mechanism. A simple and inexpensive wet and dry air cooling mechanism is still needed wherein dry heated air and wet laden heated air can be mixed before passing out of the cooling tower to thereby reduce the plume.

Another recognized problem with cooling towers is that the water used for cooling can become concentrated with contaminates. As water evaporates out of the cooling tower, additional water is added but it should be readily recognized that contaminants in the water will become more concentrated because they are not removed with the evaporate. If chemicals are added to the cooling water to treat the water these chemicals can become highly concentrated which may be undesirable if released into the environment. If seawater or waste water is used to replace the evaporated water, a common practice where fresh water is not available or costly, salts and solids in the water can also build up in the cooling water circuit As these contaminants become more concentrated they can become caked in between the thin evaporating sheets diminishing the towers cooling efficiency.

To prevent the foregoing problem it is a regular practice to "blowdown" a portion of the water with the concentrated contaminants and replace it with fresh water from the source. While this prevents the contaminants in the cooling tower water from becoming too concentrated, there may be environmental consequences to discharging water during the blowdown process. Efforts have therefore been made to reduce the water consumption in cooling towers.

U.S. Pat. No. 4,076,771 to Houx, et al. describes the current state-of-the-art in reducing the water consumption in a cooling tower. In the system described in this patent both cooling tower evaporative heat transfer media and a coil section that transfers heat sensibly are provided in the same system. The sensible heat transfer of the coils provides cooling of the process water but does not consume any water.

While the foregoing patent represents a significant advancement over prior art cooling towers, it would be desirable if a mechanism were developed for recapturing water from the plume for replacement back into the cooling tower water reservoir which did not require a coil section for sensible heat transfer.

A separate problem that has been noted is the desalination of sea water, and purification of other water supplies, to create potable drinking water. Numerous approaches have been developed to remove purified water from a moist air stream. The major commercial processes include Multi-Stage Flash Distillation, Multiple Effect Distillation, Vapor Compression Distillation, and Reverse Osmosis. See "The Desalting ABC's", prepared by O. K. Buros for the International Desalination Association, modified and reproduced by Research Department Saline Water Conversion Corporation, 1990. Examples of systems that use low temperature water for desalination or waste heat include the following:

"Zero Discharge Desalination", Lu, et al., Proceedings from the ADA North American Biennial Conference and Exposition, August 2000. This paper provides information on a device that produces fresh water from a cold air stream and a warm moist air stream from a low grade waste heat source. The fresh water is condensed along the walls separating the two air streams. Also, a cold water is sprayed over the warm moist air to enhance condensation.

"Open Multiple Effect Desalination with Low Temperature Process Heat", Baumgartner, et al., International Symposium on Desalination and Water Re-Use, Vol. 4, 1991. This paper provides information on a plastic tube heat exchanger used for desalination that uses cold running water on the inside of the plastic tubes and warm moist air flowing over the exterior of the tubes. The condensate forms on the outside of the cold tubes.

The foregoing show that there is a need for desalination systems for converting sea water, or other water supply containing high levels of contaminants, into a purer water supply. A simple and cost effective means of condensing the effluent of a cooling tower as a source of water would therefore be desirable.

SUMMARY OF THE INVENTION

In one aspect of the invention a heat exchanger is provided having a first set of passageways formed for receiving a first stream of air. A second set of passageways for receiving a second stream of air is also provided in the heat exchanger, the second stream of air being warmer than said first stream of air. Each passageway of the first set of passageways is separate but adjacent to at least one passageway of the second set of passageways so that heat from said second air stream will be absorbed by the first air stream. A reservoir for capturing moisture that condenses out of said second air stream is also provided.

In another aspect of the invention a heat exchanger is provided having two opposing walls configured with holes to allow for the passage of a first air stream. Tubes are provided between a hole in the first wall and a corresponding hole in the second wall for channeling the first air stream there through. Walls provided between at least two parallel edges of one wall and the corresponding parallel edges of said second wall ensure that a second air stream can be channeled passed said tubes to condensed moisture out of the second air stream.

In another aspect of the invention a method of reducing the moisture content of an air stream is provided wherein a first air stream having a flow rate between 10 and 80 pounds of dry air per square foot per minute ($pda/ft^2/min$) and a relative humidity at or above 90% is directed through a first set of passageways. A second air stream having a flow rate between 10 and 80$pda/ft^2/min$ and a dry bulb temperature at least five Fahrenheit degrees below the second stream is directed through a second set of passageways. Each passageway of the first set of passageways being separated from at least one passageway of the second set of passageways by a thin heat conductive material. Heat from the second air stream is absorbed into the first air stream and water condensed out of the second air stream is captured. In yet another embodiment of the invention, a cooling tower is provided having a counterflow evaporative media and a water distribution system that distributes hot water over the counterflow evaporative media. A heat exchanger that absorbs heat from a first air stream into a second air stream is also provided, the heat exchanger having a first set of passageways and a second set of passageways. A fan in the cooling tower directs air through the counterflow evaporative media to create said first air stream and directs the first air stream, having a flow rate between 10 and 80 pounds of dry air per square foot per minute ($pda/ft^2/min$) and a relative humidity at or above 90%, through the first set of passageways. The fan also directs the second air stream having a flow rate between 10 and 80 $pda/ft^2/min$ and a dry bulb temperature at least five Fahrenheit degrees below the second stream through the second set of passageways. Each passageway of the first set of passageways being separated from at least one passageway of the second set of passageways by a thin heat conductive material. A reservoir is provided for capturing water condensed out of the first air stream.

In another aspect of the invention a cooling tower is provided having a fan at the top of the cooling tower for creating a negative pressure inside the cooling tower. A counterflow evaporative media is provided along with spray heads that spray hot water onto the counterflow evaporative media. A heat exchanger having a first set of passageways for passing an air stream from outside the cooling tower into the center of the tower and a second set of passageways for passing an effluent air stream from the evaporative media is also provided in the heat exchanger. The air stream from outside the cooling tower absorbs heat from the effluent air stream and thereby condenses water out of the effluent.

In yet another aspect of the invention, a cooling tower is provided with a fan at the top of the cooling tower for creating a negative pressure inside the cooling tower. A crossflow evaporative media and a hot water distribution system that sprays hot water onto the crossflow evaporative media are provided. A heat exchanger having a first set of passageways for passing a first air stream from outside the cooling tower into the center of the tower and a second set of passageways for passing an effluent air stream from said evaporative media is provided. The air stream from outside the cooling tower absorbs heat from the effluent air stream and thereby condenses water out of the effluent.

In another aspect of the present a cooling tower is provided and an inside and an outside and a longitudinal axis. The cooling tower includes a evaporative media along with a liquid distribution system that distributes hot liquid over the evaporative media. The cooling tower also includes a heat exchanger that transfers heat from a first air stream into a second air stream. The heat exchanger comprises at least one generally diamond shaped heat exchanger pack having a first set of passageways and a second set of passageways. The cooling tower further includes an air current generator that directs that directs the first air stream through the evaporative media and the first set of passageways. The air current generator also directs the second air stream through the second set of passageways.

In still another aspect of the present invention, an apparatus for reducing the heat content of an air stream is provided. The apparatus includes a means for directing a first air stream through a first set of passageways of a generally diamond shaped heat exchanger. It also includes a means for directing a second air stream through a separate, second set of passageways of the generally diamond shaped heat exchanger. The apparatus further includes a means for transferring heat form the first air stream into the second air stream.

In still yet another embodiment of the present invention, a method for reducing the heat content of an air stream is provided, comprising the steps of: directing a first air stream through a first set of passageways of a generally diamond shaped heat exchanger; directing a second air stream through a separate, second set of passageways of the generally diamond shaped heat exchanger; and transferring heat from said first air stream into said second air stream.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Heat Exchanger Pack

Figure 1:
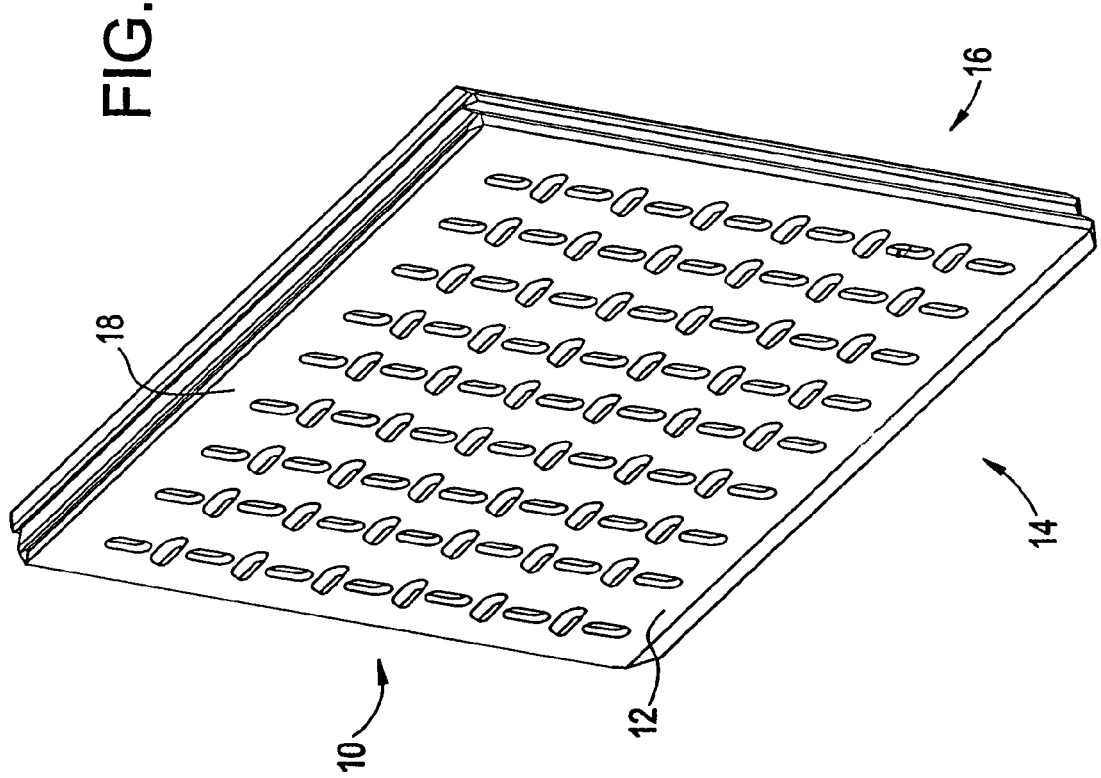
FIG. 1 is a perspective view of a portion of a heat exchanger of a preferred embodiment of the invention.

Referring now to the figures wherein like reference numerals indicate like elements, in FIG. 1 there is shown a vapor condensing heat exchanger pack 10. The heat exchanger pack 10 is constructed of thin sheets 12 that are bonded together to form a pack that has a first path 14 and a second path 16 for two different air streams. In a preferred embodiment, the two air streams enter the heat exchanger pack 10 at right angles to each other and are kept separate by the thin sheets 12.

The thin sheets 12 are a relatively thin synthetic resin material that are shaped to assist in condensing vapor from a heated water laden air stream passing through passageways 14 and transferring heat to a cool air stream passing through passageways 16. In a preferred embodiment, the material is 0.005 to 0.040 inches in thickness but is preferably 0.015 to 0.020 inches in thickness. The surface 18 may be textured to provide extended surface area presented to each of the air streams with a minimal amount of resistance to the air stream flow. Examples of texture patterns appropriate for such use can be found in U.S. Pat. Nos. 5,944,094 to Kinney, Jr., et al. and U.S. Pat. No. 3,995,689 to Cates, the disclosures of which are incorporated herein by reference. Other texture patterns may include but not be limited to textures such as dimples similar to golf ball texture and girded texture similar to a screen pattern embossed in the plastic sheet. This increased surface area enhances the heat transfer capabilities of the thin sheet and increases the velocity fluctuations near the sheet surface, which improves the local mixing of the individual air stream. The increased fluctuations and resulting local mixing of the air stream also improves the heat transfer capabilities of the sheet.

Figure 2:
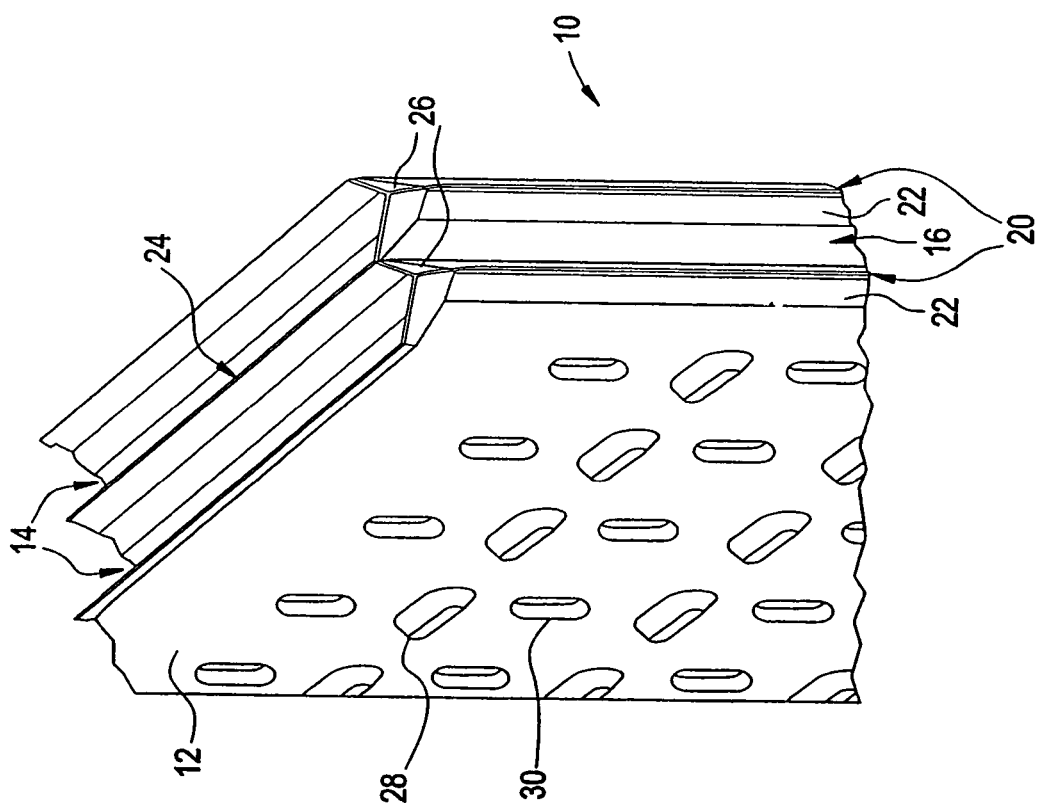
FIG. 2 is a perspective view of a section of the heat exchanger of FIG. 1 enlarged to show detail.

As depicted in FIG. 2, to prevent the two air streams from mixing during the heat exchange process, a seal 20 is formed in the thin synthetic resin sheet on a first edge. This seal is formed by the raised edges 22 of the thin sheet material 12, on one edge of the sheets 12, that meet in the center of the air passageways 14, or in other words, is raised one-half the width of the passageways 14. This edge seal 20 extends along the length of the air passageway 14 parallel to the air passageways 16.

Similarly, a seal 24 is formed by the raised edges 26 of the thin sheet material 12, on the edge perpendicular to the seal 20, that meet in the center of the air passageway 16, or in other words, is raised one half the width of the passageway 16. This edge seal 24 extends the length of the air passageway 16 parallel to the air passageway 14.

Although not shown, the edge parallel to seal 20 and the edge parallel to seal 24 are similarly bonded. Thus, perpendicular passageways 14, 16 are formed within the heat exchanger pack.

One raised edge 26 extends positively off of the formed sheet and the other 22 downward or negatively. In this arrangement a single sheet component can be used to form the basis of the entire heat exchanger pack. This is accomplished when assembling the pack by stacking the sheets 12 on top of each other and turning over every other sheet and locating it on the previous sheet. Although only three passageways are depicted, it should be readily recognized that in use the heat exchanger pack will have many perpendicular passageways and that any number of passageways can be formed using the sheets 12 as disclosed herein.

To maintain the opening of the air pathways, spacer knobs or buttons are formed in the thin sheet material. These buttons are spaced similarly to the edge seal and extend either positively 28 from the formed sheet or negatively 30 from the formed sheet a distance of half of the width of the air passage opening. In a preferred embodiment, the buttons 28 that extend positively are conidial in shape having a flat top surface when viewed in the direction of the air flow through passageway 16. When placed together the flat surfaces of the buttons of one sheet are arranged opposite the flat surface of the buttons on the adjacent sheet. Each of the positively protruding buttons 28 extends along a length of the thin sheet parallel to the direction of airflow. In a preferred embodiment, the buttons 30 which protrude negatively have the same shape as the buttons 28 that protrude positively but are perpendicular in orientation. Again, the negatively protruding buttons 30 of one sheet are arranged opposite the negatively protruding buttons of the adjacent sheet. An alternate spacer embodiment which positions and interlocks the sheets may be found in Kinney '094.

The foregoing features are designed to maintain a consistent width of the air passageways and resist collapsing the passageways when a differential pressure is applied between the two passageways. The configuration of the buttons is also designed to provide a minimal resistance to airflow while providing sufficient structural resistance to collapse of the passageways.

The width of each of the passageways for either the cool air stream or the vapor laden air stream can be varied according to the design conditions of the particular task. Also, the cool air passageway 16 and the vapor laden air passageway 14 do not necessarily have to be of equal widths. Practically, for the particular tasks of the current invention, the passageway widths would be at a minimum of 0.5 inches wide and a maximum of 3.0 inches wide with a preferred width between 1.0 inches and 1.5 inches.

The overall dimensions of the completed pack of thin sheets are also dependent on the particular design task associated with the invention. However, the minimal pack size envisioned for the design is 2 feet by 2 feet and the maximum is 6 feet by 24 feet.

The air entering the face of a heat exchanger pack is characterized by the mass flow over the gross face area. Typically this is expressed as pounds of dry air per square foot of area per minute (pda/ft$^2$/min). In the preferred embodiment, each set of air passages has a mass flow rate between about 10 pda/ft$^2$/min to about 60 pda/ft$^2$/min.

The temperatures of the warm moist air stream for the preferred embodiment of the three processes, water conservation, water purification, and plume abatement, are typical of those experienced by cooling towers and other waste heat rejection devices. These temperatures would range from a maximum of about 150 degrees F. to a minimum of about 40 degrees F. Evaporative cooling towers typically discharge air that is saturated or nearly saturated (about 100% relative humidity). Similar evaporative devices that supply air with a relative humidity of about 90% or higher are feasible for this invention. Air streams with relative humidities below about 90% require significant sensible heat transfer to cool the air streams to their respective dew points. Condensation can only take place after the air stream reaches the saturation curve at the dew point.

For the preferred embodiment the operating pressures for the heat exchanger pack will be about the same as typical cooling tower operating pressures, in a range of +/−6 millibars. In general cooling towers operate at or near atmospheric pressure. Cooling towers have axial fans and/or blowers, also known as centrifugal fans, that create slight changes from atmospheric pressure to generate flow through the packing media, spray, and drift eliminators. These different components cause a restriction to the air flow by friction and velocity differentials hence a pressure change from atmospheric is required to force the air through the tower. These pressures are typically in a range of +/−3 millibars for axial fan systems and +/−6 millibars for systems with a blower. It is customary to consider such cooling tower systems operating at these relative small pressure differentials to be operating at atmospheric pressure.

General Condensation Process

As described, the vapor-condensing heat exchanger is arranged in a pack with passageways for two different air streams. In the passageways 16 cool air is delivered from an outside source or from the surrounding ambient air mass. The method of obtaining the cool air is dependent on the specific application for the device. The cool air temperature will typically be significantly below the air mass temperature of the air stream in the opposing passageways 14. In the opposing passageway 14 warm moist air is delivered into the path. The warm moist air is typically saturated with water vapor or has a dry bulb temperature that is at or near the resulting wet bulb temperature. This air mass is similar to that generated by a cooling tower which is used to reject waste heat from a process. However, other processes and methods that generate a similar warm moist air stream can be used for the input into this device such as an evaporative condenser.

Figure 3:
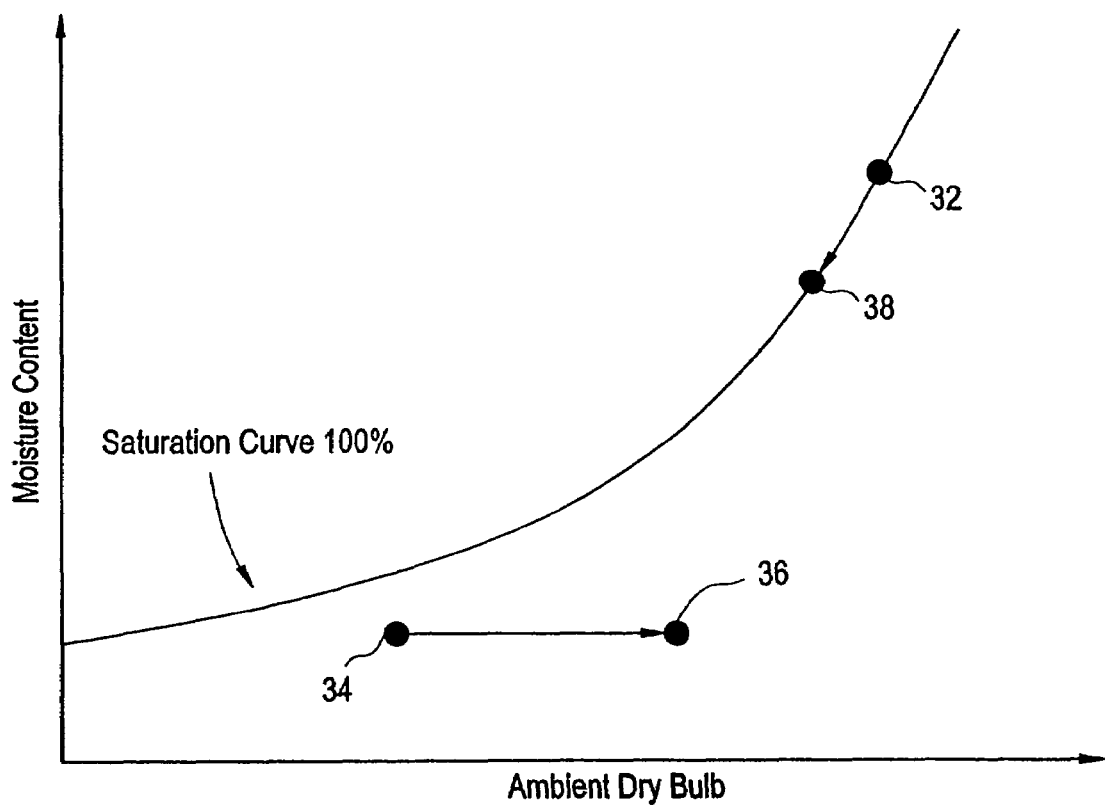
FIG. 3 is a graphical representation of a psychrometric chart for a heat exchanger.

As shown in the psychrometric chart of FIG. 3, the warm moist air is at a point 32 on the depicted saturation curve. The location of the point 32 on the saturation curve where the warm moist air is indicates that it is 100% saturated with water vapor at a high temperature. The cool air entering the other passageway is located at a point below the saturation curve 34. The location of the cool air on the psychrometric chart indicates that it is at a lower temperature than the entering warm air. The moisture content associated with this air stream is generally not relevant to the functionality of the device. In the case of plume abatement, however, the moisture content of the entering air effects not only the moisture content of the "mix", but also the tangency of the mix line.

As the two air streams pass through the heat exchanger the warm air stream is cooled and the cold air stream increases in temperature. Because the two air streams do not physically contact each other, the cool air stream is heated in a way that no moisture is added or removed from the air stream. This is known as a sensible heating of the air stream. As noted on the psychrometric chart, upon exiting the heat exchanger the cool air has an increased temperature but the moisture content has been maintained constant 36.

The warm moist air is cooled from its initial point on the saturation curve 32 to a lower temperature. As the warm moist air mass is cooled the moisture content of the air stream must be reduced. Since the air stream is 100% saturated, water will condense out of the air stream and the resulting decrease in temperature will follow the 100% saturation curve to the new cooler temperature 38. The amount of heat lost in the warm saturated air stream must equal the amount of heat gained in the cool dry air stream.

Desalination research led to the serendipitous discovery that the exiting dry air of the air to air exchanger was much higher than expected. This discovery makes possible plume abatement with a device previously assumed inadequate. Conventional wisdom suggested that an air-to-air heat exchanger for plume abatement is much less effective than a water-to-air heat exchanger such as coils or the plastic heat exchanger as disclosed by Kinney in '094. Cool ambient air is drawn from outside of the tower and heated sensibly. The heat source for warming this air would seem to favor water over air because of it's much larger mass. For example the plastic heat exchanger in '094, typically has a flow rate of 20 gpm/sf or more. The mass flow rate then is typically 20 gpm/sf×8.33 lbm/gallon=167 lbm/sf/min or more. The air-to-air heat exchanger as discussed above operates in a range from 10 to 80 pda/sf/min. The total mass flow is determined by multiplying the dry air rate times $(1+w_s)$ in which $w_s$ is the humidity ratio. Assuming 100° F. saturated air, the humidity ratio, $w_s$ is 0.0432. The mass of this air stream varies from 10.4 to 83.5 lbm/sf/min. Therefore, the water flow mass of the '094 plastic heat exchanger is typically several times greater than the air flow mass of the present invention. For comparable amounts of dry heat the air to air exchanger would seem to require a change in temperature of both air streams of several times that of the water stream in the '094 heat exchanger. This was not thought to be possible unless the surface was increased several times the surface area of the water-to air heat exchanger to accomplish the same heat transfer. Therefore, the size of the air-to-air heat exchanger would seem to increase to unmanageable or uneconomic proportions. However, using the heat exchanger of 10, FIG. 1., described previously the warm moist air stream is subject to a condensation process. In the condensation process, warm air comes in contact with a cool surface and water condenses out of the air. In this process both sensible and latent heat are released and the absolute humidity is reduced. Since both latent and sensible heat is transferred in the device it becomes much more efficient than previously thought possible.

In the passageway with the warm moist air 14, when the vapor comes in contact with the cool surface of the cool passageway, droplets of condensate are formed on the surface of the passageway with the warm moist air stream. These droplets are a result of the warm moist air being cooled and the resulting moisture reduction of the air stream. These droplets coalesce on the sheet and flow down the warm moist air stream passageway surface of the sheet. The moisture that condenses onto the sheet can either be collected at the base of the sheet or returned into the original source. The use of this water will be discussed further below.

Processes for Heat Exchanger

Water Conservation for Cooling Towers

As discussed in the previous section, warm moist air flowing through the heat exchanger passageway is cooled and the moisture content is reduced. The reduction in moisture content of the warm air causes droplets to be formed on the warm air passageway of the sheet. These droplets coalesce and fall from the bottom of the sheet. The water reclaimed from the moist air stream can be used to reduce the water consumption of a cooling tower apparatus.

Cooling towers reduce the temperature of process water through an evaporative process and thus provide a place to remove heat from a system. The heat removed is typically not useful for other processes and labeled "low grade waste heat" and is released to the surrounding atmosphere. Through the cooling tower process a certain percentage of the process water that is circulating through the system is lost due to evaporation. The amount of water lost through the evaporation process is typically between 0.5% to 3% of the total flow rate. Generally this is roughly 0.8% for every 10° F. of cooling of the process water. This loss of water can be costly to operators of cooling tower apparatuses.

The water leaving the tower through evaporation is in a pure vapor state, therefore, other contaminants such as solids, dissolved solids, salts, etc., are left in the process water. Over time, as pure water is removed these contaminates build up in the process water. To reduce the contaminants a certain percentage of the process water is removed continually. The water removed from the system is called blowdown. Therefore, to operate a cooling tower water must be added to both compensate for the evaporation of the water and the required blowdown. In many instances this water is difficult to discharge directly into the environment because of the quality of the chemical laden water and the increased regulations associated with discharging water. Therefore, there is a significant economic advantage in reducing the amount of blowdown.

With the air to air heat exchanger 10, FIG. 1, described above water reclaimed from the warm moist air stream can be put back into the system. This will in effect reduce both the evaporation of the tower and the required blowdown of the system. Configurations of a cooling tower incorporating this heat exchanger will be described below. Since the water returned to the cooling tower system is nearly pure water, in many instances, it may be of better quality than the original make-up water. This improved water quality could also potentially reduce the amount of chemicals required for the cooling tower process.

In order for the heat exchanger to operate effectively and return water back into the system, the air temperatures entering into the cool air passageway must be below the warm air entering the opposing passageway. For a water conservation apparatus, as the two temperatures become closer to the same value the amount of water returned to the basin will be less. If the cool side of the heat exchanger is supplied with ambient air temperatures and not cooled by other means, the heat exchanger will return more water when the temperatures are cooler or during winter operation. During summer operation the heat exchanger will return less water. Typical values of water returned back into the basin will range from 40% of the evaporated water during the winter months to 3% of the evaporated water during summer operation. Water returned on an annual basis would be around 10% to 30% depending on the location. Table 1 below shows the percentage of evaporation water reclaimed for various locations in summer and winter. The numbers provided are for maximum water reclaimed from cooling tower effluent based on local conditions and a power plant duty of a 25-degree Fahrenheit range.

|  | Wyoming | Nevada | Florida | New York | Saudi Arabia |
|---|---|---|---|---|---|
| Summer | 15% | 3% | 11% | 16% | 3% |
| Winter | 40% | 23% | 21% | 32% | 14% |

Water Purification and Desalination

A cooling tower generates warm moist air during the evaporation/heat rejection process. This warm moist air contains nearly pure vapor and is free of most contaminants such as solids, dissolved solids, salts, and chemicals. A significant portion of this pure vapor can be recovered when this type of heat exchanger is employed. In addition to recycling the water back into the cooling tower reservoir, the pure vapor when converted back into the water state can be used for other applications that require a source of clean water. Because of the expense associated with providing process water for cooling towers, often the make-up water used is either salt water from ocean sources or wastewater from an industrial process. When employed as a water reclamation device this heat exchanger is capable of converting water that is otherwise undesirable because of the quality of water.

While not pure, the resultant water will be free of most impurities. Viruses, biological impurities, and a small amount of dissolved solids may be entrained in the vapor. Also, a small amount of process cooling water may also be entrained into the moist air stream and contaminate the condensed water. This type of carry over is termed "drift" in the cooling tower industry. A secondary purification process may be employed to obtain further levels of desired water quality. The advantage provided by the present process can be seen in the case of sea water desalination to create potable water. In the case of desalination of sea water, one of the most expensive steps in the process is removing the salts. The foregoing cooling tower reclamation process could be used to reduce the salt content considerably so that a less expensive process could be used for the final purification of the water. An example of a process that can be used for the final purification process is reverse osmosis.

The process of recovering the water for other uses is essentially the same as has been described previously in the water conservation section above with the exception that the water recovered from the heat exchanger pack can be collected in a separate basin. Details of a cooling tower application with a recovery basin are described below.

As with the water conservation tower, if the surrounding air is used as the source for the cool side temperatures, as air temperatures increase during the summer months the production of clean water will decrease. Typical water recovered from this system will be 20% to 25% of the total water evaporated on an annual basis. If a source of either cold air or water is available more water could be reclaimed from the system. For example, if a source of cold ocean water is available it could be used to cool the incoming air in the cold passageway of the heat exchanger. As the temperature difference increases between the warm and cold side of the heat exchanger sheet the condensation will increase and thus more clean water will be generated. A configuration that would improve the rate of clean water production when a source of cold seawater is available will be described below.

The water purification device is well suited for use in a cooling tower because of the generation of warm moist air, however other devices that generate warm moist air could also be used in conjunction with this device.

Plume Abatement for Cooling Towers

The heat exchanger of the present invention can also be used to reduce the visible plume of a cooling tower. This process is essentially the same process as the water conservation process. The only difference is the cold air heated in the cold side passageway is mixed with the warm moisture laden air stream. The mixture of these two air streams can effectively reduce the presence of the visible plume by an approach different than typical plume abatement towers.

Figure 4:
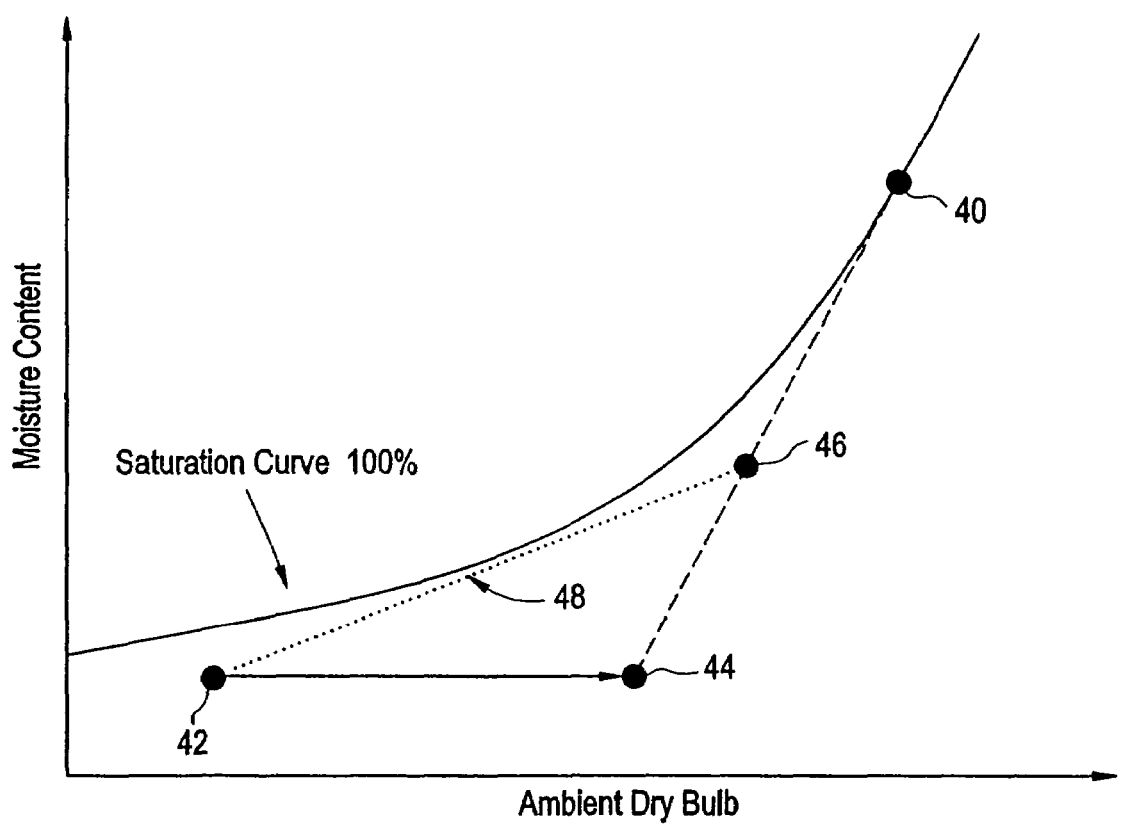
FIG. 4 is a graphical representation of a psychrometric chart for a plume abatement process.

A typical method used to reduce the visible plume in a cooling tower is depicted on the psychrometric chart of FIG. 4. As depicted in the chart, effluent air from the evaporative section of a cooling tower is warm 100% saturated air 40. Warm water from the heat source is also sent through a coil or other heat exchanger located on the side of the tower. The warm water is used to heat the ambient air 42. Air is then pulled through both the evaporative heat section and the water/air heat exchanger. The ambient air 42 that flows through the water/air heat exchanger is heated without any change in the moisture content (i.e. sensible heat transfer) 44. The warm dry air 44 then exits from the air/water heat exchanger.

The warm dry air stream 44 exiting the air/water heat exchanger is then mixed with the moist air stream 40 exiting the evaporative section of the cooling tower. The mixture of these two air streams results in an air stream 46 which has the property that when the exiting cooling tower air stream 46 temperature and the ambient air temperature 42 are connected with a line on a psychrometric chart, the connecting line 48 does not cross over the 100% saturation curve. If the connecting line 48 were to cross over the 100% saturation curve when the ambient and exiting air are mixed, condensation of the water vapor from the air stream of the evaporative section would occur creating a visible plume or fog. The area above the 100% saturation curve is the super saturated area and is also termed the fog area. Therefore, systems are designed such that when the properties of the air mass exiting the cooling towers and the ambient air mass properties are mixed no visible plume will occur for a given design condition.

Using the air to air heat exchanger 10, FIG. 1, of the present invention, the typical process is modified by reducing the moisture content of the air stream from the evaporative section and providing a source of warm dry heat to reduce the plume. The reduction in moisture of the warm moist air stream is a reduction in the absolute humidity of the air stream. The water content of the air from the evaporative section of the cooling tower is reduced by use of the air to air heat exchanger as described above. The source of the warm dry air is the ambient air that is heated in the heat exchanger from the cold air passage.

Figure 5:
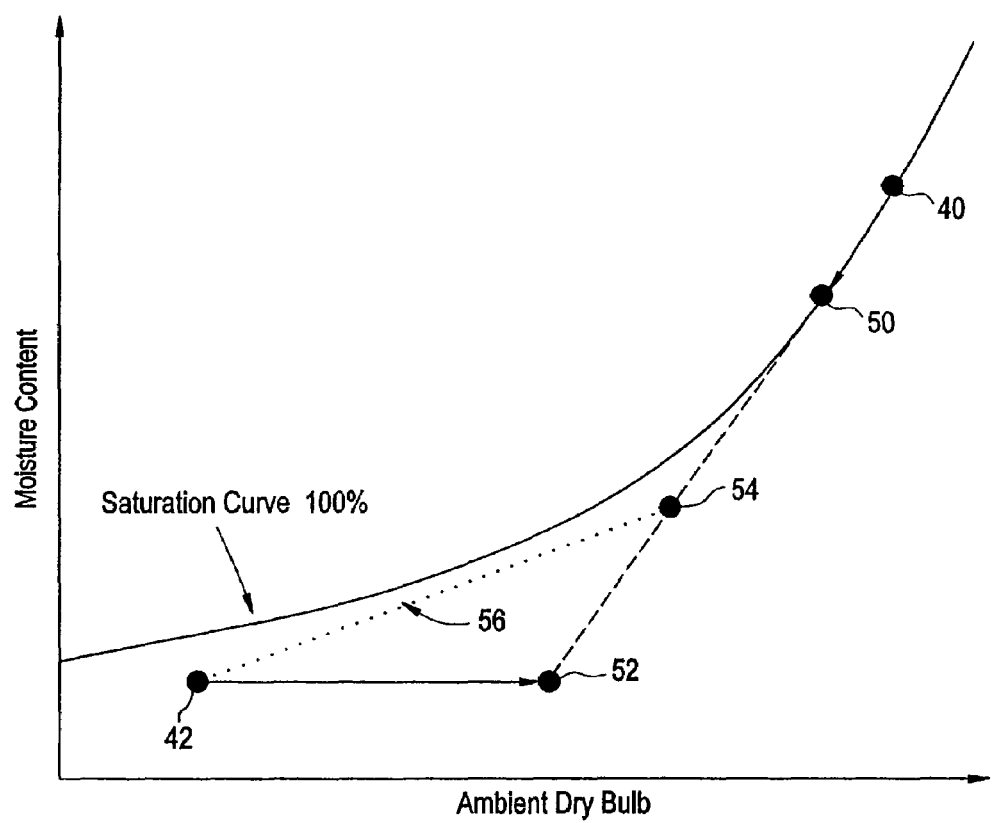
FIG. 5 is a graphical representation of a psychrometric chart for a plume abatement process with a moisture condensing heat exchanger.

The plume abatement process with the air to air heat exchanger of the present invention is depicted in the psychrometric chart of FIG. 5. As the exiting air from the cooling tower evaporative section 40 passes through the heat exchanger the temperature and moisture content are reduced 50. The ambient air, 42, is heated in the opposing passageway resulting in a warmer dry air stream 52. The two air streams are mixed together forming a resultant air mass 54 below the saturation curve. When the ambient air mass 42 is mixed with the air mass from the mix of the two air streams 54 in the cooling tower the properties do not cross over into the super saturation area of the curve or the fog area. This is depicted by a line 56 connecting the ambient air mass 42 and the mixed air mass 54 on the psychrometric chart.

The foregoing method for plume abatement is very effective for the reduction of the plume because moisture that could cause a plume to form is partially removed from the tower before entering the surrounding ambient conditions. The method is also less complicated because there is no water used in the heat exchanger system. Since no water is used in the heat exchanger it eliminates the complexity of providing another piping system for the cooling tower.

Cooling Tower Configurations

Figure 6:
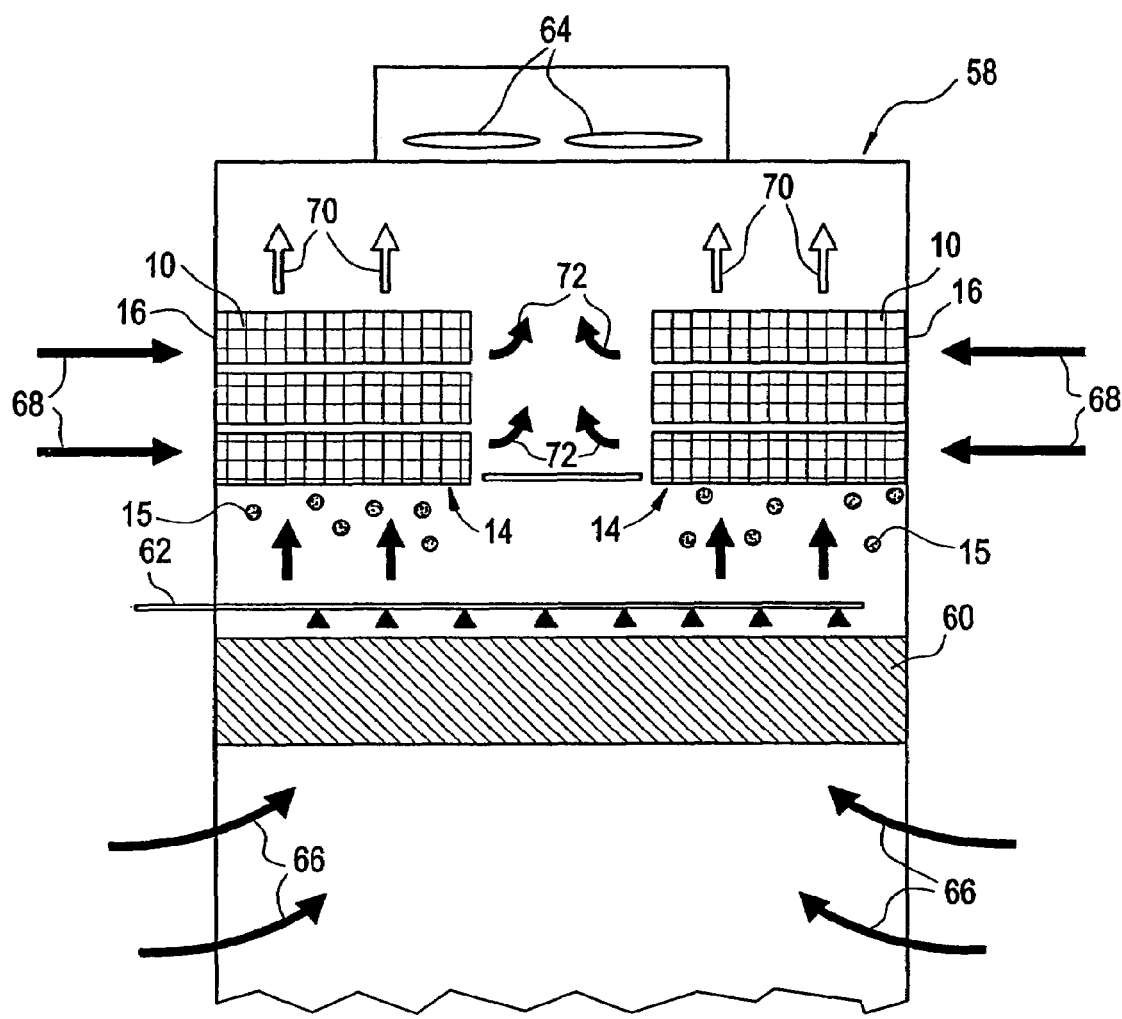
FIG. 6 is a block diagram representation of a cooling tower in accordance with a preferred embodiment of the invention.

A first preferred embodiment of a cooling tower 58 employing the heat exchanger described above is depicted in FIG. 6. In this configuration the heat exchanger 10 is located above the evaporative media 60 in a counterflow arrangement. This placement of the heat exchanger would be best suited for the water conservation and plume abatement configurations. The process employed by this cooling tower is as described below.

Hot water from the heat source is pumped through a conduit having spray heads 62 and sprayed over the evaporative media 60. An axial fan (or fans) 64 assist airflow of cool ambient air 66 through the evaporative media. In the evaporative media 60, the air is heated and moisture is evaporated into the air stream. The heated water laden air is then directed through air flow passageways 14 of the heat exchanger 10. Ambient air 68 is also directed through separate passageways 16 of the heat exchanger perpendicular to the flow of the heated water laden air. The cool ambient air 68 generates a cool surface on the heat exchanger 10 for the vapor to condense on. The condensate 15 will fall from the heat exchanger back into the main water collection area of the cooling tower. Condensate droplets size is exaggerated in the Figures for clarity. The two air streams 70, 72 exiting the heat exchanger 10 are combined near the fan inlet.

Figure 7B:
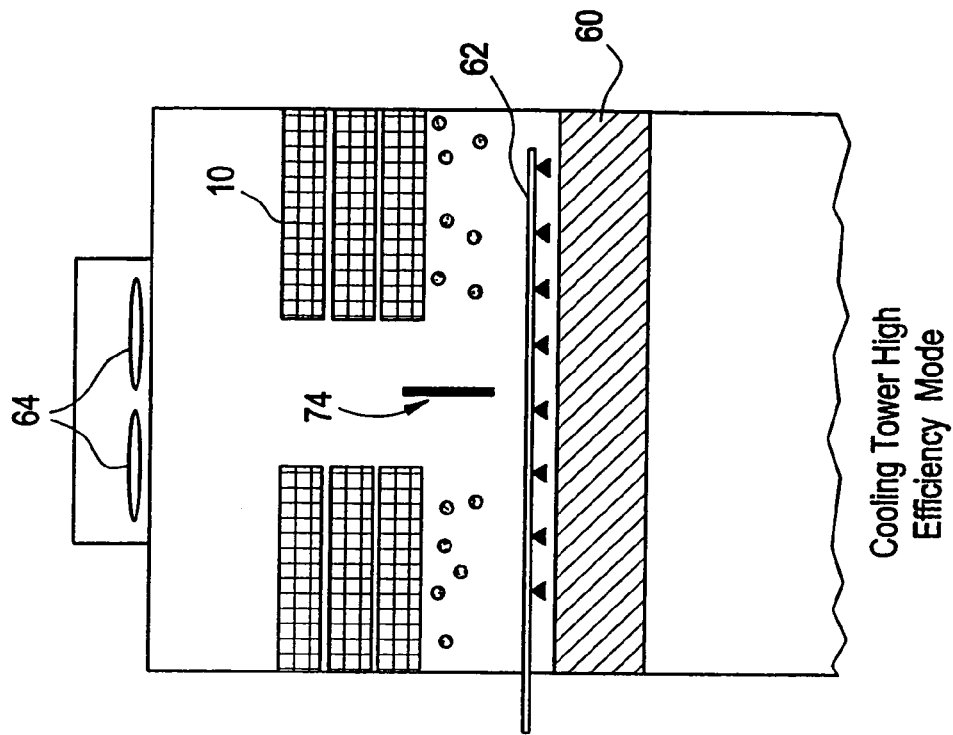
FIGS. 7A and 7B are block diagram representations of a cooling tower in accordance with another preferred embodiment of the invention.
Figure 7A:
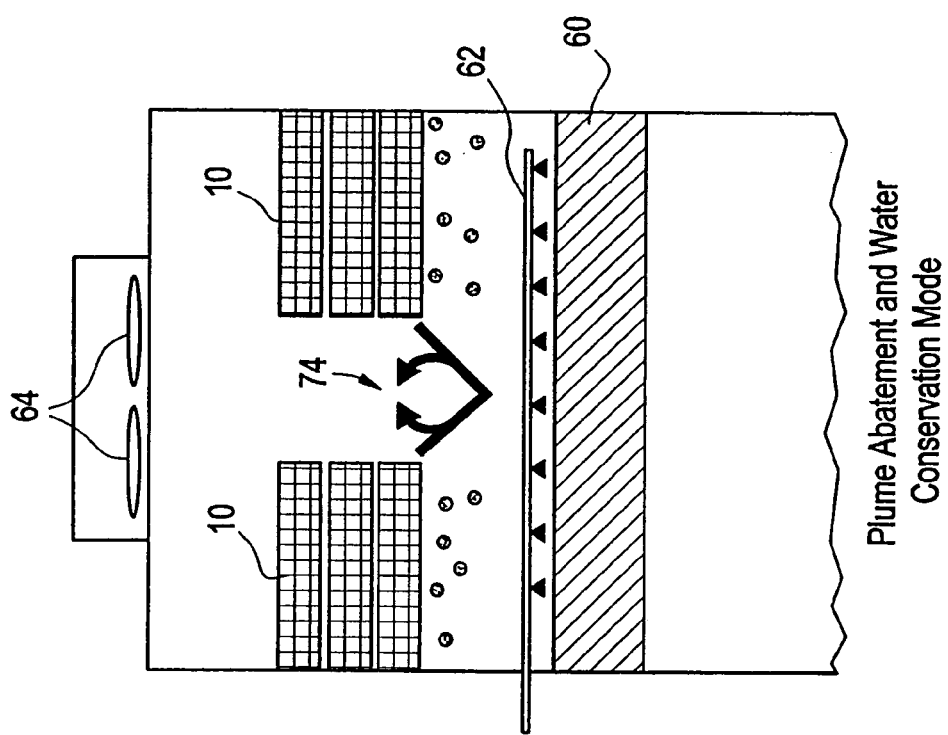

The air-to-air heat exchanger 10 when incorporated into a cooling tower will create a resistance to the fan 64. The increased resistance will require that the power be increased to the fan 64 in order to maintain the same flow rate through the cooling section with the addition of the heat exchanger 10. As depicted in FIGS. 7A and 7B, during operational times when more cooling tower performance is necessary, air vent doors 74 located in the tower may be opened. When opening these doors 74 a significant amount of air will bypass the heat exchanger 10 and go directly to the fan 64. This will reduce the air resistance created by the heat exchanger 10 and increase the amount of air that will flow through the cooling tower media 60. By increasing the airflow through the media 60, the performance of the cooling tower will increase. However, when bypassing the heat exchanger 10 the water conservation, water purification, and plume abatement processes are halted.

Figure 8A:
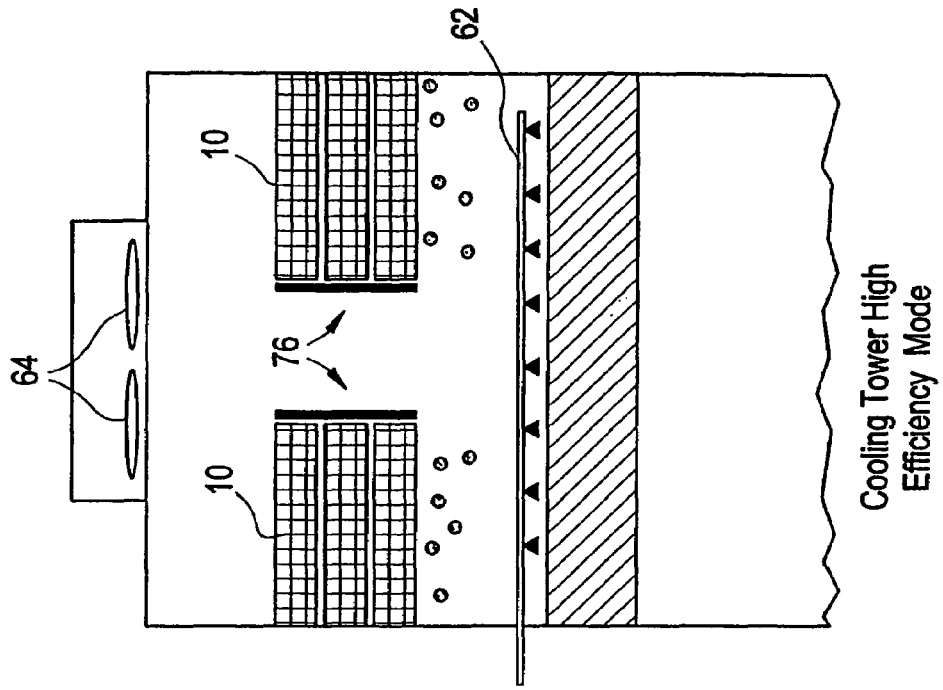
FIGS. 8A and 8B are block diagram representations of a cooling tower in accordance with another preferred embodiment of the invention.
Figure 8B:
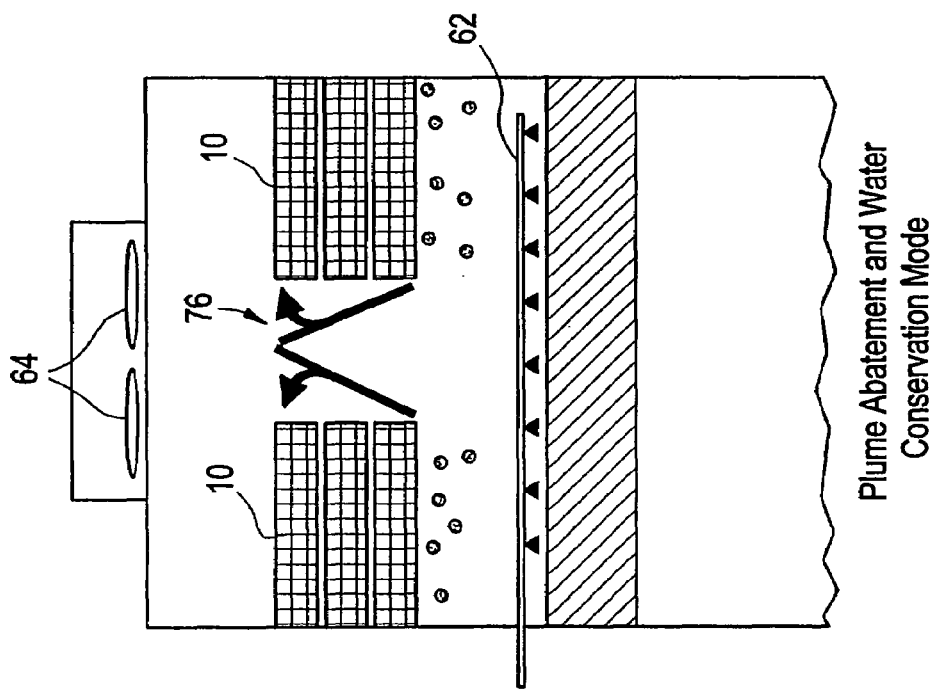

An alternate embodiment of the doors are depicted in FIGS. 8A and 8B. In this configuration the doors 76 not only provide a method to allow the warm moist air to bypass the heat exchanger 10, but also provides a way to close off the cold side of the heat exchanger. In effect, becoming damper doors.

Figure 9:
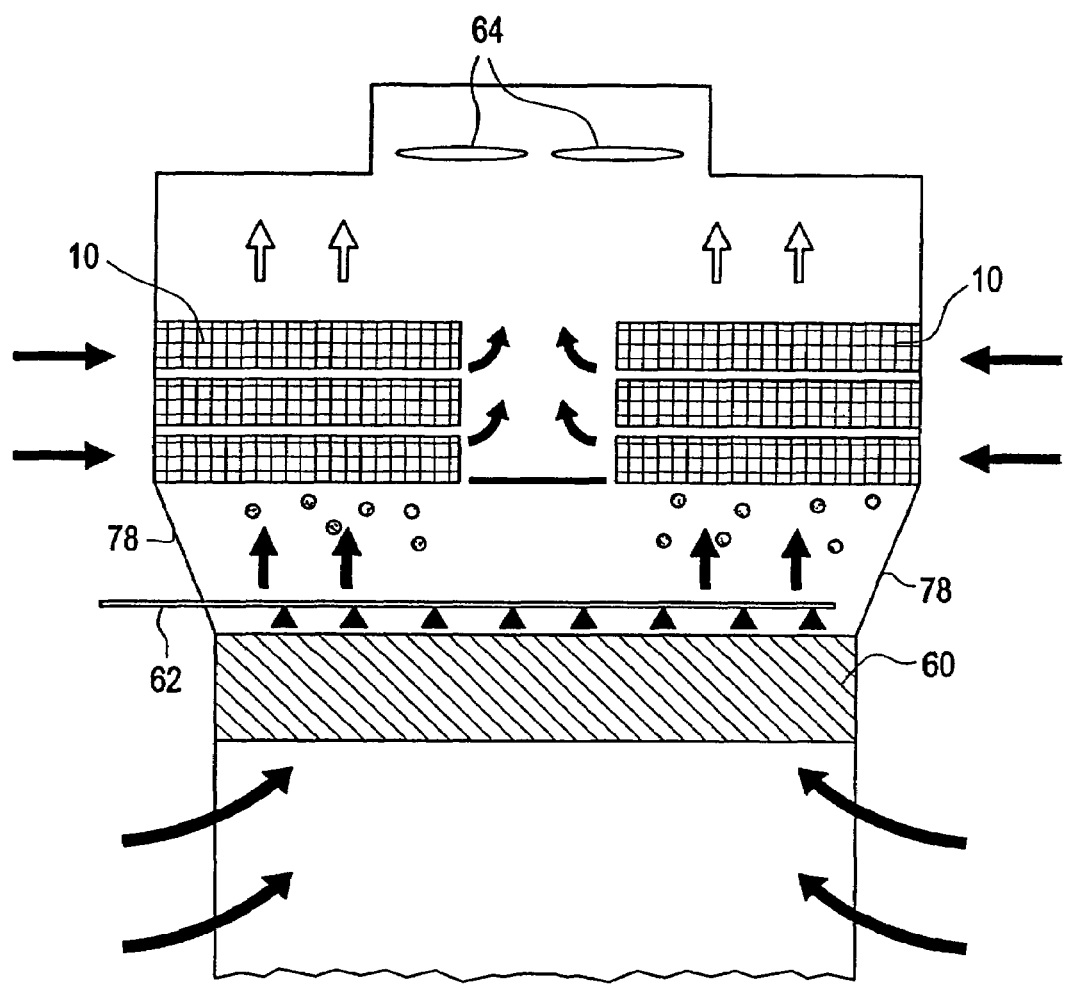
FIG. 9 is a block diagram representation of a cooling tower in accordance with another preferred embodiment of the invention.

Another method to reduce the amount of resistance in the heat exchanger 10 is to increase the flow area of the heat exchanger pack. As depicted in FIG. 9, in order for two different air streams (warm moist air and cold ambient air) to flow through the single fan 64 of a cooling tower, a portion of the flow area from the cooling tower media is blocked off. Since a portion of the flow area is blocked off the velocity of the air stream must be increased accordingly. This increased velocity of the flow creates more resistance when passing through the heat exchanger 10. In order to reduce the resistance, the heat exchanger flow area may be expanded by the amount of the blockage. In this configuration the heat exchanger pack 10 is in effect cantilevered beyond the cooling tower media 60. This reduces the velocity of the warm moist air through the heat exchanger and reduces the amount of pressure drop in the system.

Figure 10:
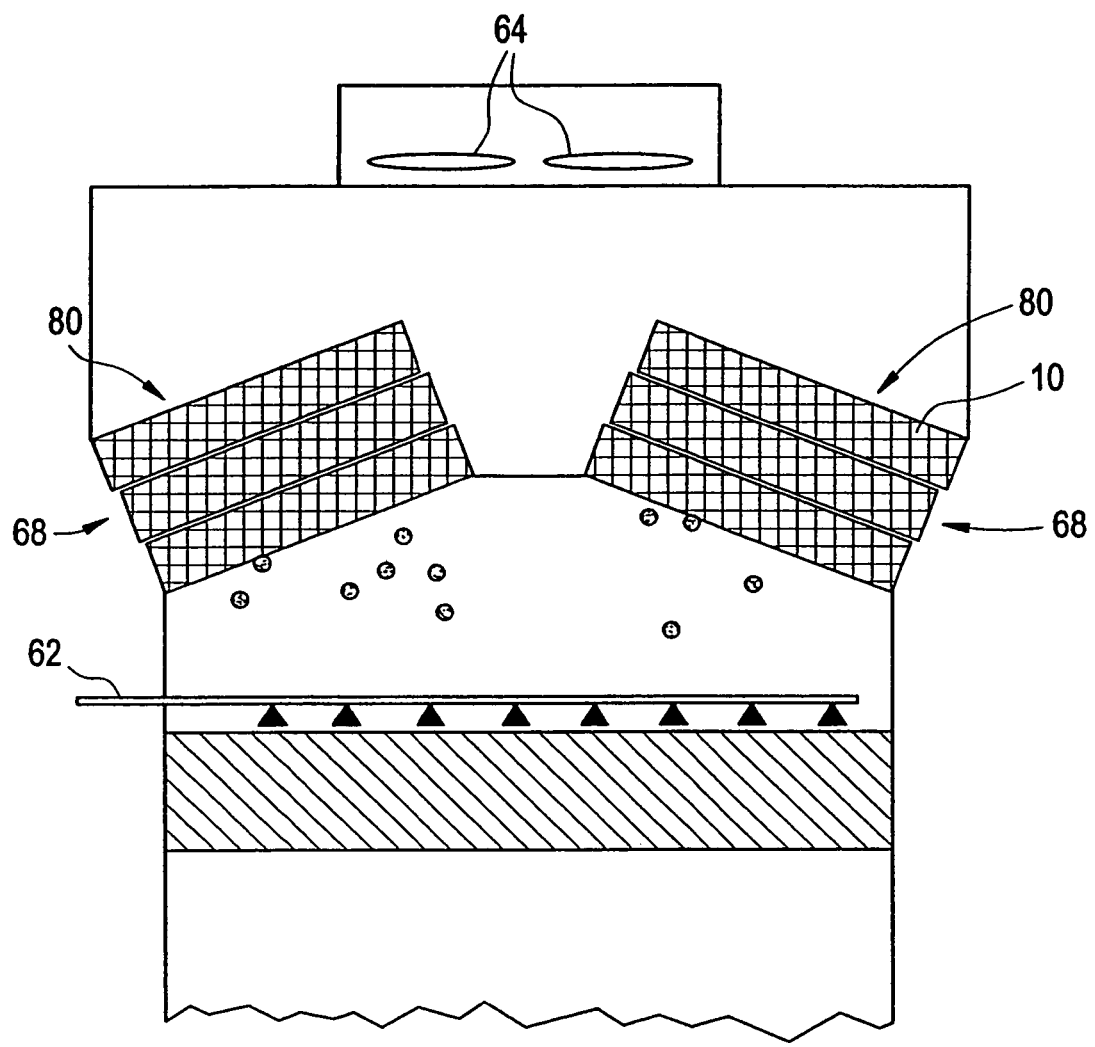
FIG. 10 is a block diagram representation of a cooling tower in accordance with another preferred embodiment of the invention.

A third way to configure the heat exchanger 10, as depicted in FIG. 10, is to tilt the heat exchanger pack 10 upward 80 toward the fan 64. This configuration would provide an increased flow area for the heat exchanger and reduce the pressure drop as described previously. This configuration would also provide an improved air path for the air flowing on the inward-facing portion 68 of the heat exchanger 10 (cold path), since the outlet of the pathway is positioned more towards the fan 64. The improved air path will result in less resistance and pressure drop for the heat exchanger cold side. Tilting heat exchanger 10 may also be accomplished without cantilevering heat exchanger 10 beyond cooling tower media 60.

Figure 11:
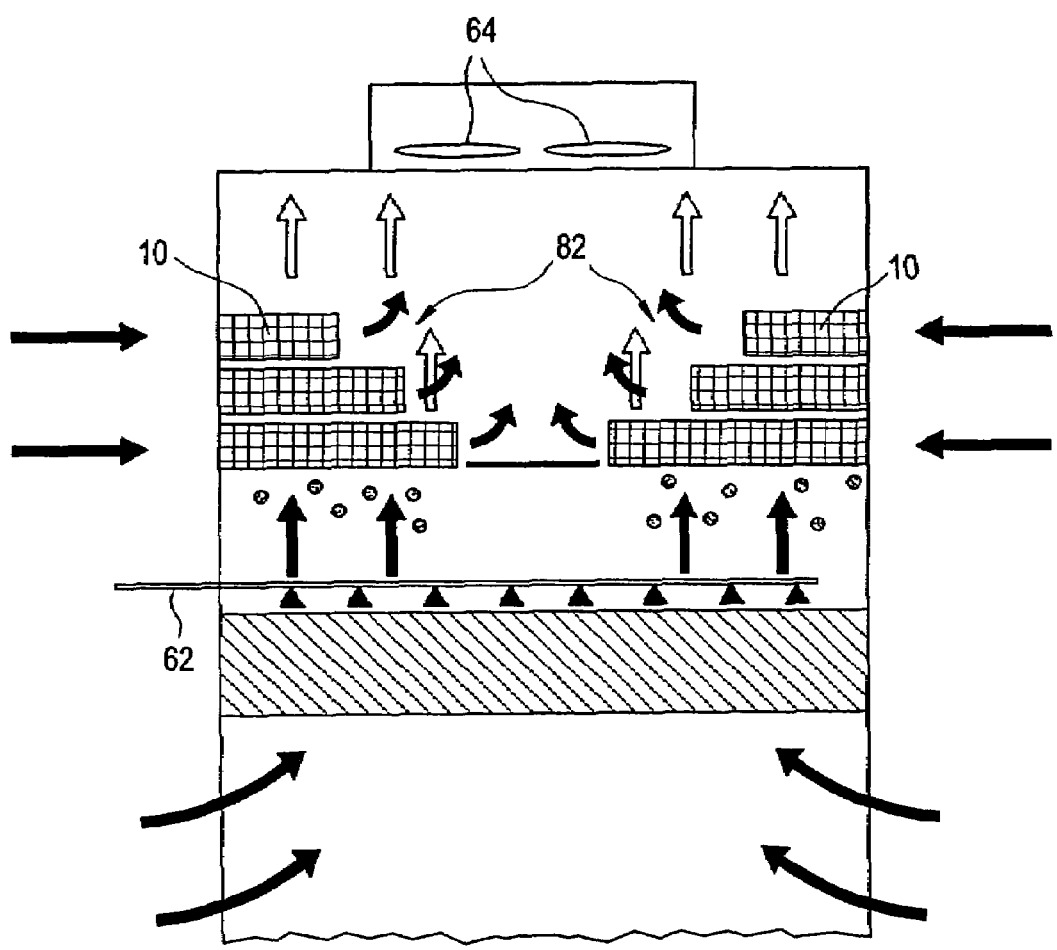
FIG. 11 is a block diagram representation of a cooling tower in accordance with another preferred embodiment of the invention.
Figure 12:
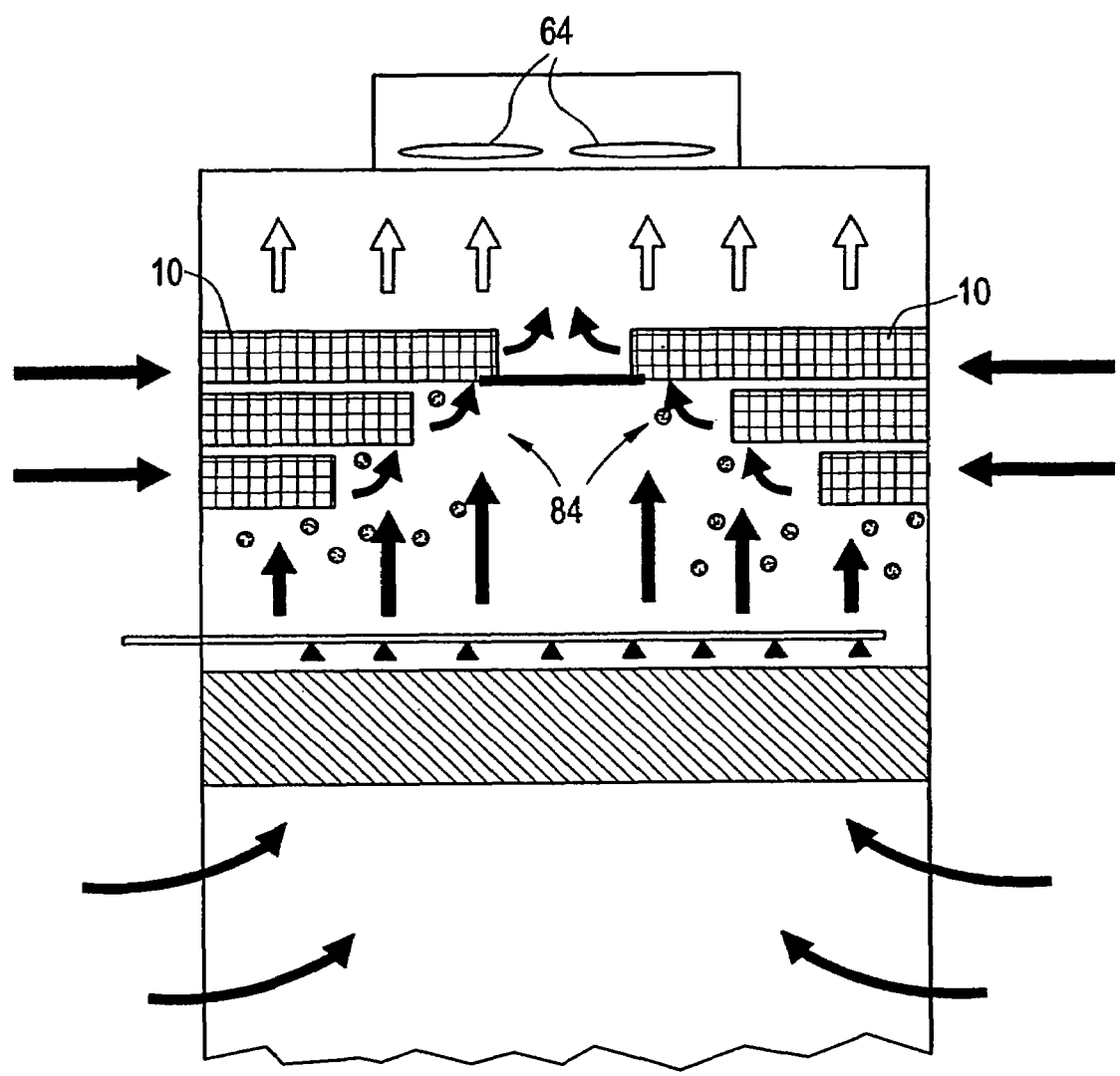
FIG. 12 is a block diagram representation of a cooling tower in accordance with another preferred embodiment of the invention.

In the configuration of FIG. 11 the length of the heat exchanger pack 10 has been reduced in the upper sections 82. In this configuration the pressure drop of the system will be reduced because there is less heat exchanger media for the warm moist air to travel through. It will also provide better mixing of the moist air stream and the dry air stream. The mixing of the two air streams is important in the plume abatement process in order to ensure that warm moist air does not mix with the cold ambient air to form a fog. Similarly, as depicted in FIG. 12, the lower portions of the heat exchanger pack 10 can be reduced 84 to reduce pressure drop.

Figure 13:
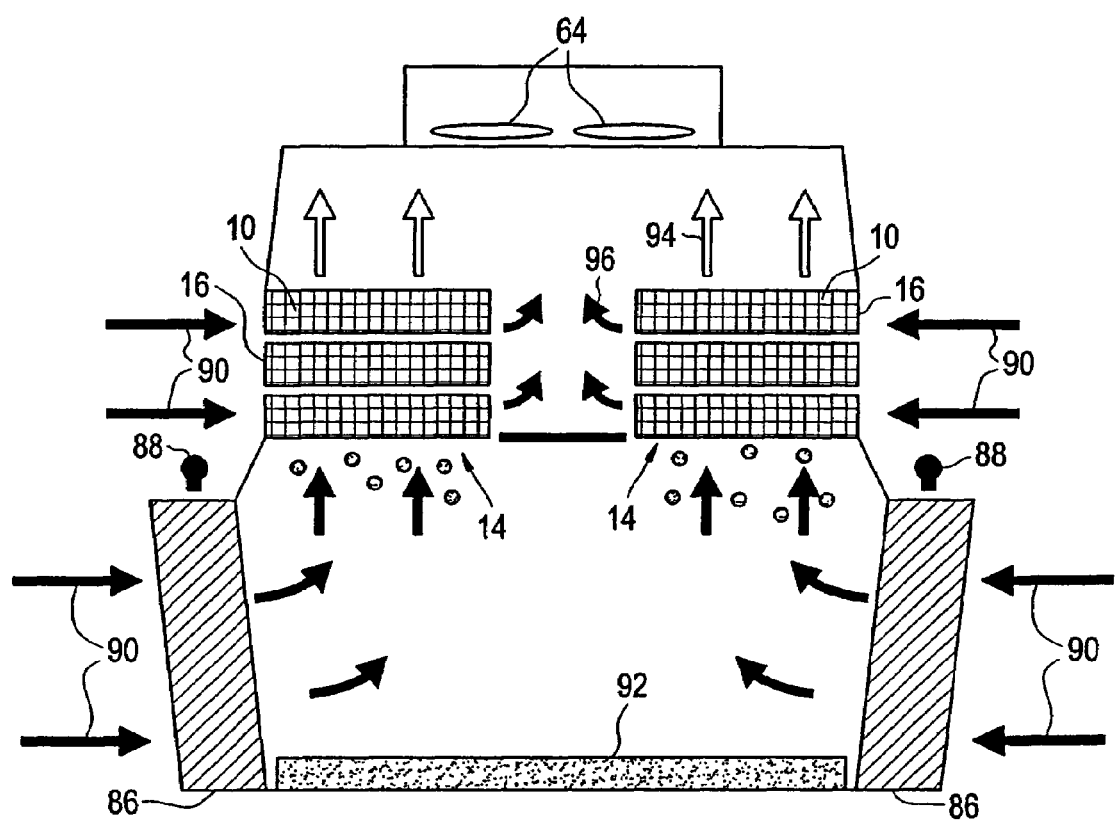
FIG. 13 is a block diagram representation of a cooling tower in accordance with another preferred embodiment of the invention.

In an alternate embodiment of the cooling tower, the counterflow evaporative media is replaced with a crossflow media 86 as depicted in FIG. 13. The heat exchanger media 10 is located in the path of the exiting wet air stream in the plenum of the crossflow cooling tower. The placement of the heat exchanger 10 and evaporative media 86 in this configuration would be best for the water purification and plume abatement processes. The operation of this cooling tower is as described below.

Hot water from the heat source is pumped to water distribution system 88 and distributed over the crossflow evaporative media 86. An axial fan 64 assists airflow of the ambient air 90 through the evaporative media 86 and through the inward-facing panel 16 of the heat exchanger 10. Air currents exiting the evaporative media 86 are directed upward through the outward-facing panel 14 of the vapor-condensing media (heat exchanger) 10. The cool ambient air 90 condenses the vapor on the outward-facing panel. The condensate falls from the heat exchanger back into reservoir 92 where it can be collected for other uses or returned back into the main circulating water system. The air streams from both the inward-facing panel and the outward-facing panel 94, 96 are combined near the fan inlet.

It is to be further understood that the doors 74 and 76 as shown in FIG. 7A, 7B, 8A, and 8B for counterflow cooling towers may be readily incorporated in crossflow cooling tower configurations. Furthermore, the tilting of heat exchanger pack 10 and the stepping of the heat exchanger pack 10 as shown in FIG. 10, 11, and 12 for counterflow cooling towers may be readily incorporated in crossflow cooling towers.

Figure 14:
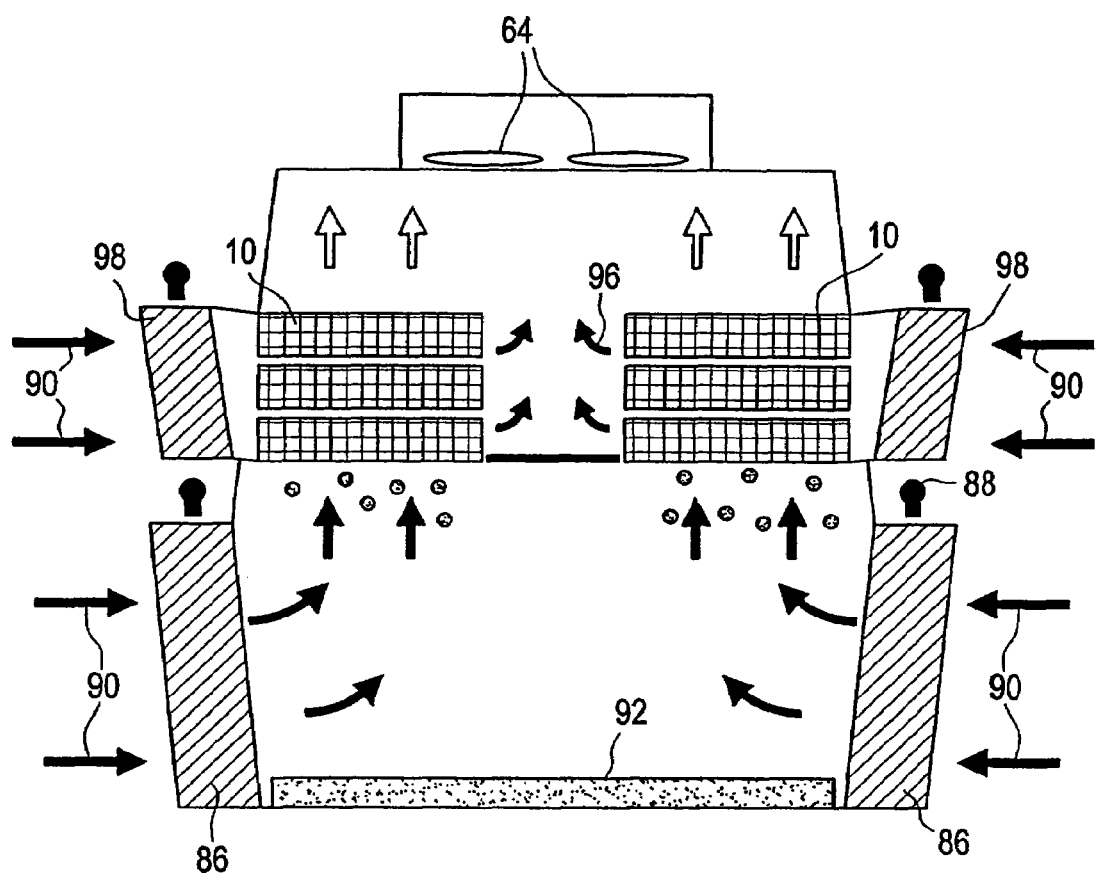
FIG. 14 is a block diagram representation of a cooling tower in accordance with another preferred embodiment of the invention.

During operation of the system as a water purification or desalination system the ambient temperatures may not be cold enough to provide the desired output of clean water from the condensation process. In order to boost the output of clean water from the heat exchanger 10 a secondary system may be required to reduce the temperature entering into the cold side of the heat exchanger 10. As shown in FIG. 14, another bank of cooling tower heat transfer media 98 may be placed in front of the cold side entrance of the heat exchanger 10. The cooling tower media 98 would be sprayed with cold water to chill the incoming air. A possible source for the cold water may be an ocean source or other large body of water that is cooler than the ambient dry bulb. If the wet bulb temperature is low, the cold water source does not necessarily have to be significantly colder than the ambient dry bulb. The air would then enter in the cooling tower media and the temperature of the air reduced before entering into the cold side of the heat exchanger.

Figure 15:
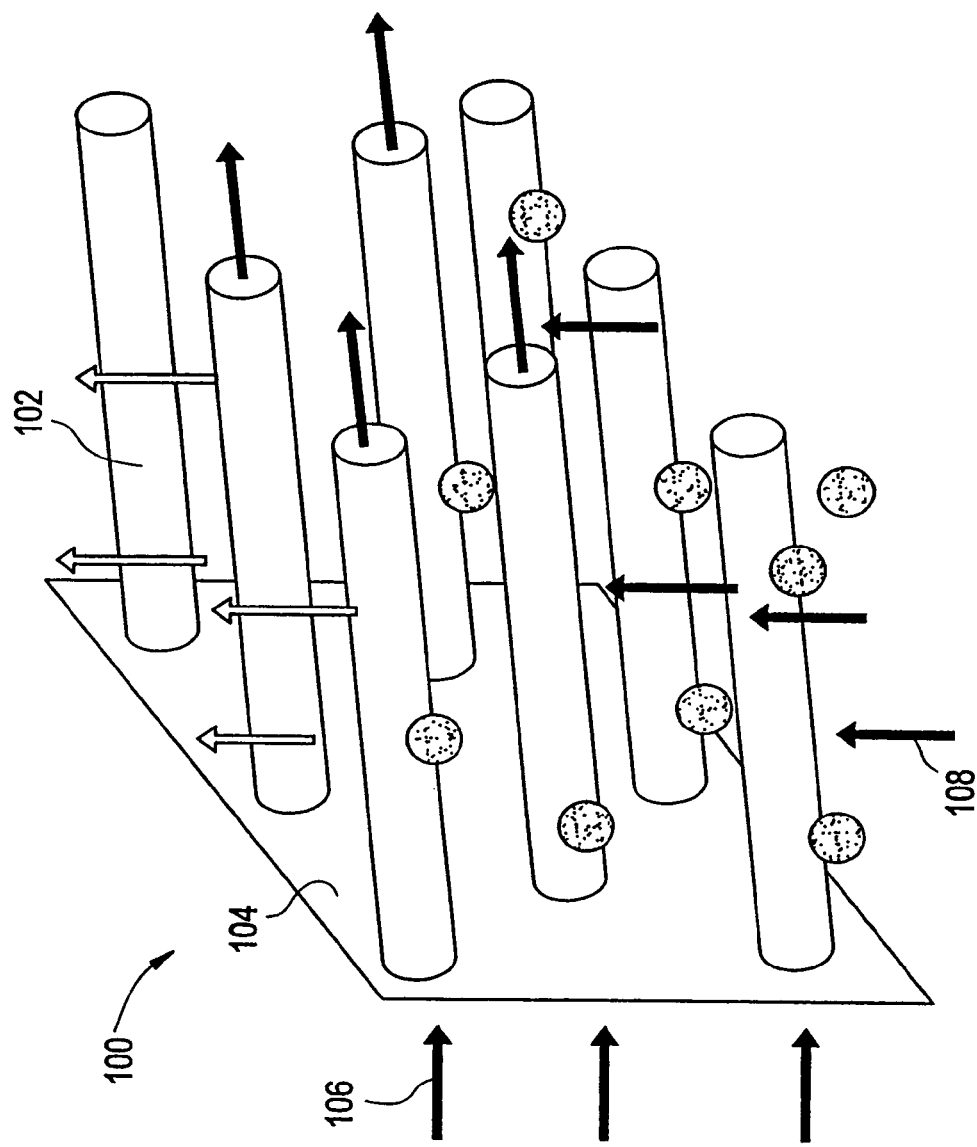
FIG. 15 is an illustration of a tubular heat exchanger in accordance with a preferred embodiment of the present invention.

In an alternate embodiment depicted in FIG. 15, a tubular heat exchanger 100 is used to replace the thin resin synthetic sheet pack 10. This tubular heat exchanger will provide the same type of thermodynamic properties as the thin resin synthetic sheet pack. The tubes 102 of the tubular heat exchanger could be made from a thin synthetic material as the previously described heat exchanger or possibly a corrosion resistant metal such as galvanized stovepipe. These tubes 102 would be attached to a sheet 104 with holes so that the cold ambient air flowing inside the pipes 106 was separated from the warm moist air flowing over the pipes 108. In a preferred embodiment, the tubes 102 are six inches in diameter. The cooling tower configurations used with this type of heat exchanger 100 are the same as shown previously.

Figure 16:
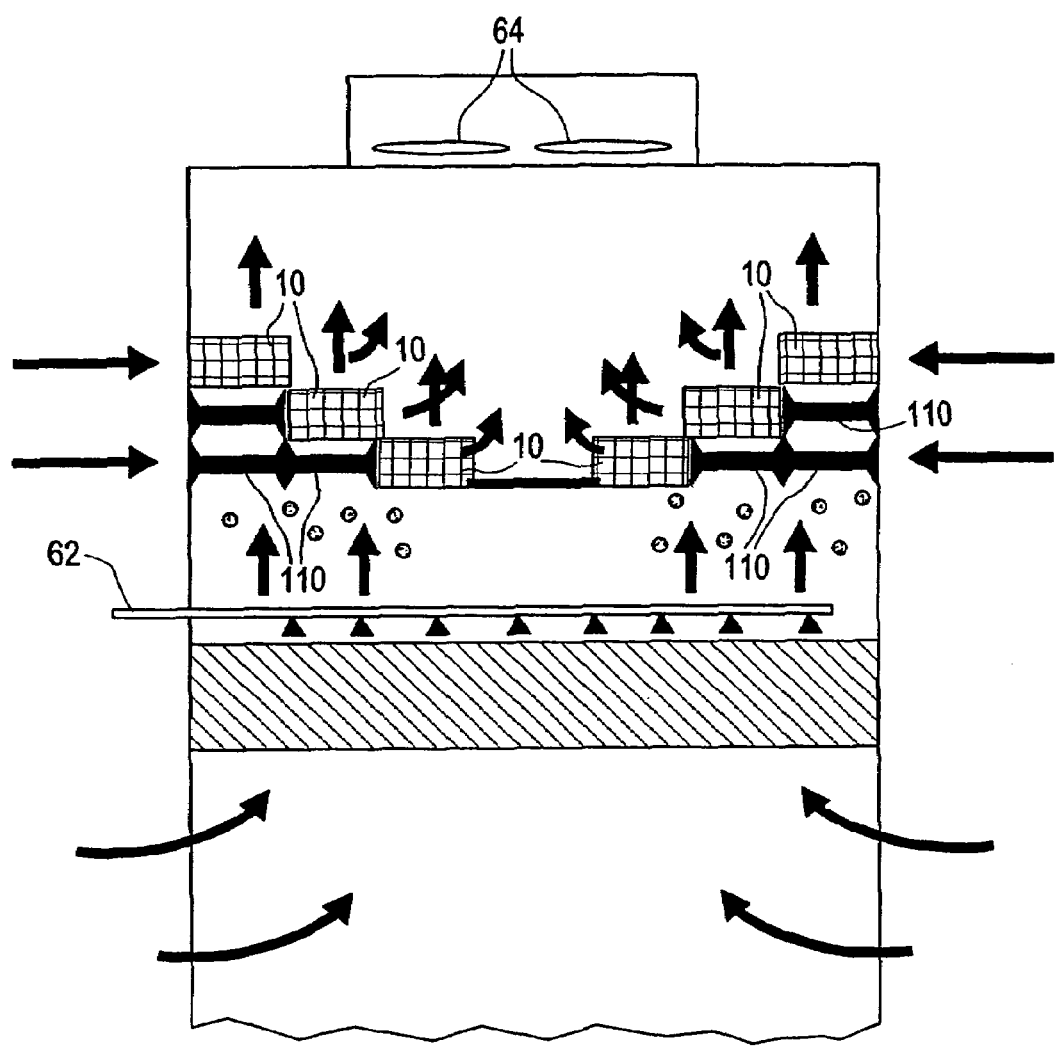
FIG. 16 is a block diagram representative of a cooling tower in accordance with another preferred embodiment of the invention.
Figure 17:
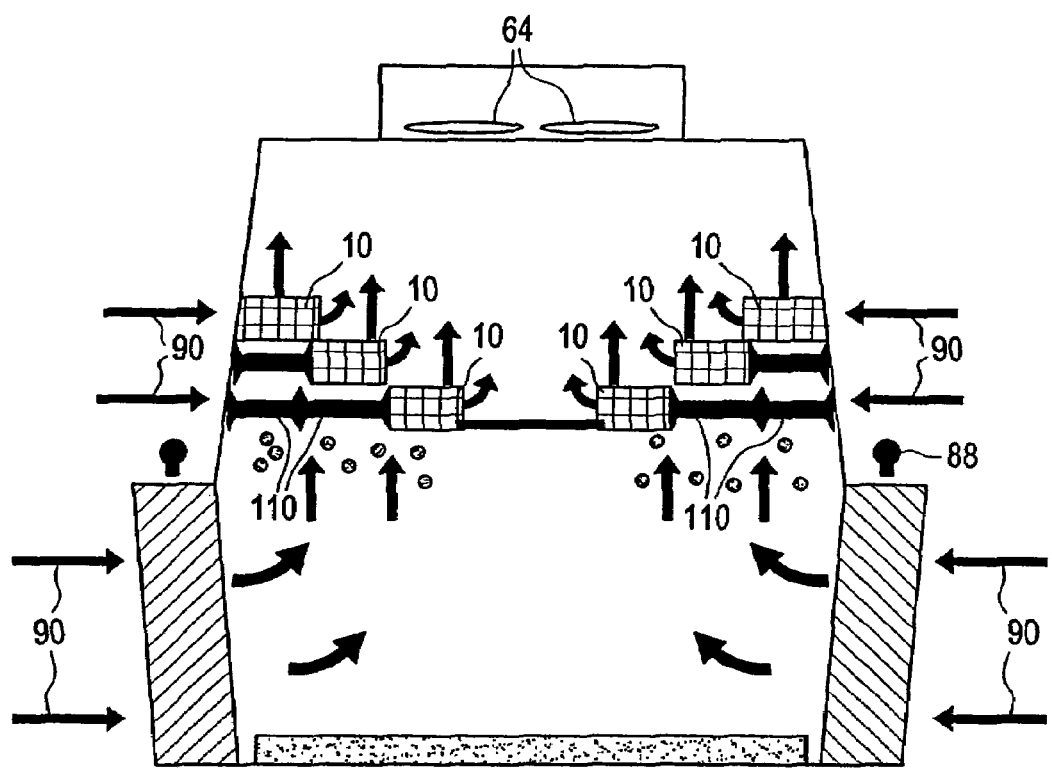
FIG. 17 is a block diagram representative of a cooling tower in accordance with another preferred embodiment of the invention.

In alternate embodiments of the cooling tower for counterflow, FIG. 16, and crossflow systems, FIG. 17, outside ambient air may be ducted to heat exchanger packs 10 located in the plenum area through one or more ducts 110. The packs would typically be in a staggered diagonal pattern. In this pattern the packs are not stacked directly above each other, thereby reducing the total pressure drop in the system. This embodiment reduces the total amount of heat exchanger 10 required by supplying cold ambient air to each heat exchanger section thus creating maximum heat transfer in each heat exchanger section. In this configuration, the geometry provides better mixing by intermingling the two airstreams. This will assist in plume reduction.

Gas to gas heat exchangers that transfer heat between two different gas streams are commonly used in industrial and power generation processes. One type of gas-to-gas heat exchanger is called a plate-fin heat exchanger. These heat exchangers are usually made of metal and consist of a flat sheet separated by a series of corrugated sheets. The corrugated sheet serves to provide structural support to the heat exchanger and provide increased heat transfer by changing the flow structure in the boundary layer and increased heat conductivity to the separating plate (fin). The separating sheet, also known as the parting sheet, separates the two air streams and transfers the heat between the two gas streams by heat conductivity. See "Process Heat Transfer", Hewitt, Shires, and Bott, CRC Press, Inc. 1994.

An advantage of the heat exchanger of the present invention is its lighter weight. For the preferred embodiment shown in FIG. 16, the operating weight for a tower with 6' bays is about 1100 lbs. The operating weight of an equivalently performing plastic heat exchanger, such as that of the Kinney '094 patent, is about 2200 lbs. Furthermore, the invention of '094 concentrates the weight at the outboard columns, whereas the weight of the heat exchanger in FIG. 16 is spread over 3 bays. This reduces the amount of load added to individual columns. Less weight or mass is also desirable for seismic design.

The present invention provides economic advantage over conventional plume abatement and water conservation. As previously mentioned the air-to-air heat exchanger avoids the cost of having to pipe hot water to the dry section of the cooling tower. Not only is the cost of the piping avoided, but also the additional cost of pumping the water over the dry section is avoided. However, the fans experience an increase in static pressure due to pulling the wet air stream through the air-to-air heat exchanger. The present invention requires approximately the same amount of power when compared to conventional 2 pass coils with a siphon loop to minimize head or less power when compared to single pass coils or the invention by Kinney in '094. In the later case the total power saving can amount to about 15' of head which for 200,000 gpm tower flow is about 900 horsepower. At $0.03/kw-hr this is a savings of about $175,000 year.

Of more importance than the power savings are the maintenance and required water quality cost savings. Coils typically have 1" to 1.25" diameter tubes. Larger tubes are typically not sufficient for the required heat transfer. Water quality must be sufficient to prevent fouling and plugging of the tubes. In the case of seawater or salt water the conventional finned tubes must be made of premium materials. This may be avoided by using the plastic heat exchanger as disclosed by Kinney in '094, the disclosure of which is incorporated herein by reference. However, the heat exchanger water passages in Kinney '094are more restrictive than coils. If the water quality is not sufficient, filtration and or chemical treatment must be employed to improve and maintain water quality. This can be expensive. The present invention avoids the cost of improving and maintaining water quality. The moisture in the wet air stream is nearly pure which will not foul the air to air heat exchanger. Water quality less than has been thought possible for plume abatement or water conservation may be used with the present invention.

Also, some cooling tower applications may have water with debris larger than the heat exchanger passageways which would plug the passageways. An example is a "once through" power plant application in which water is extracted from a river or other body of water, heated by passing through the condenser, and then sent to a cooling tower before discharging back into the body of water. The wet section of the cooling tower may have splash fill and large orifice water distribution nozzles such as disclosed in U.S. Pat. No. 4,700,893 issued to the present assignee. The '893 invention has been commercialized with 1.875" and 2.5" diameter orifices and could theoretically be larger. Therefore, water with debris larger than previously thought possible for plume abatement can be used.

The wet section of the cooling tower may have splash fill and large orifice water distribution nozzles such as disclosed by Bugler in U.S. Pat. No. 4,700,893, the disclosure of which is incorporated herein by reference. Thus fouling maintenance and water quality improvement costs are avoided. This can have an economic impact of $1,000,000 per year or more on a large power plant tower.

Finally, the initial capital cost of the present invention is less than that of the prior art. Plume abatement towers typically cost 2 to 3 times the cost of a conventional wet only tower. For a large power plant installation the plume abatement tower may cost $6,000,000 or more. The savings of the present invention can be $1,000,000 or more over conventional coil technology.

For desalination the cost per 1000 gallons of water is about $1.50 compared to $4 with multi-stage flash desalination and $3 for reverse osmosis. The present invention requires secondary treatment to produce potable water. This adds about $0.50/1000 gallons. For a plant producing 5 million gallons per day, this process can save $5,000 to $7,500 per day or about $2,000,000 annually.

The present invention provides plume abatement as a by-product on towers designed for desalination at no cost. Alternately, for cooling tower applications requiring plume abatement, desalination can be a by-product for the very little cost of collection by employing this invention.

Figure 18:
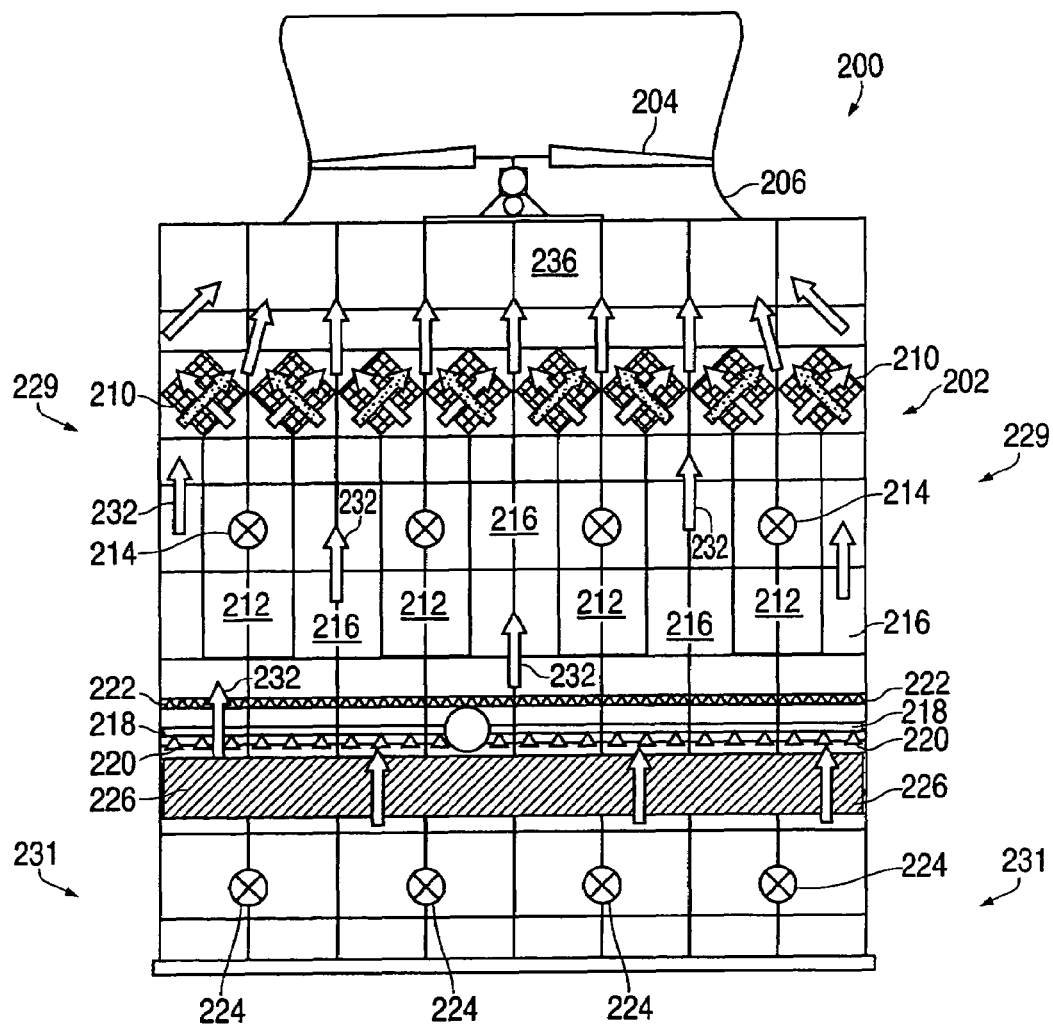
FIG. 18 is a longitudinal section view of a cooling tower in accordance with an alternative embodiment of the present invention.
Figure 19:
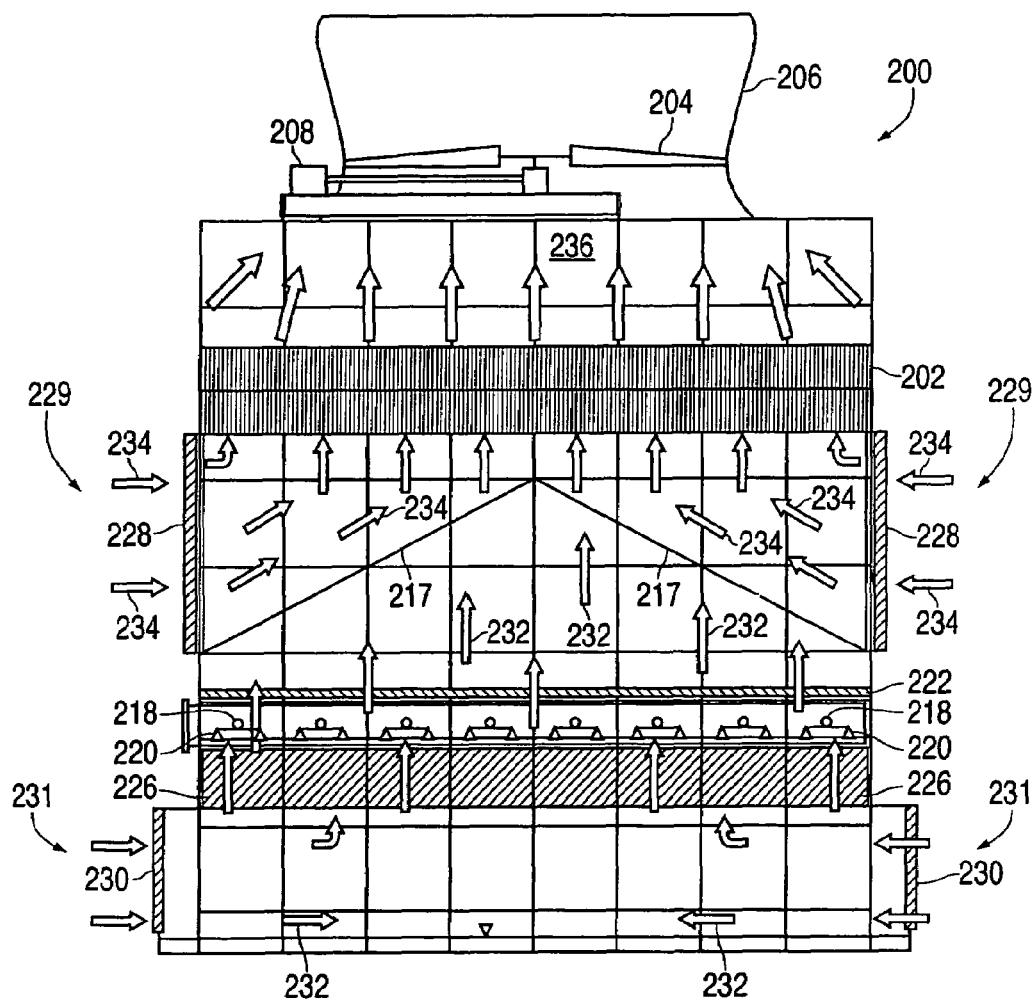
FIG. 19 is a transverse section view of the cooling tower illustrated in FIG. 19.

Referring now to FIGS. 18 and 19, a cooling tower, generally designated 200, is illustrated in accordance with an alternative embodiment of the present invention. The cooling tower 200 employs an air-to-air heat exchanger 202 similar to the heat exchanger described in the previous embodiments, along with an air current generating device such as a fan 204, which is disposed within a velocity recovery stack 206. The fan 204 is powered by a motor 208. In the embodiment depicted in FIG. 18, the heat exchanger 202 includes a plurality of individual heat exchanger packs 210, similar to the exchanger packs 210 previously described embodiments. The individual exchanger packs 210 preferably have a generally diamond shape or diamond configuration. The cooling tower 200 also includes a series of ambient air ducts 212 each having air inlets 214, along with a series of hot air passages 216 through which hot, moist air, or effluent, travels. The ambient air ducts 212 connect to the individual exchanger packs 210 as illustrated, so that the air ducts 212 are in communication with the path 16 through of the exchanger pack, as previously described in connection with FIG. 1. The warm air passages 216 are also connected to the individual exchanger packs 210 as illustrated, however the warm air passages 216 are in communication with the separate paths 14. Both the ambient air ducts 212 and warm air passages 216 are positioned below the heat exchanger 202. As illustrated in FIG. 19, the ambient air ducts 212 preferably have a slanted or sloping base 217 that slants downwardly, away from the longitudinal axis A of the cooling tower. This assists in helping the air flow in duct 212 to maintain a constant air stream velocity for more uniform distribution to heat exchanger 202, however a slanted base 217 is not required.

The cooling tower 200 also includes a hot liquid conduit 218 having a series of hot water distributors or spraying nozzles 220 along with a drift eliminator 222 and a plurality of cooling tower, lower air inlets 224 located along the bottom portion of the cooling tower 200. The cooling tower 200 further includes evaporative heat transfer media 226 disposed between the cooling tower lower air inlets 224 and the spraying nozzles.

In the cooling tower configuration depicted in FIG. 18, the heat exchanger packs 210 are preferably positioned adjacent to one another in a series so that the individual exchanger packs 210 abut one another, extending horizontally across the interior of the cooling tower. The aforementioned positioning prevents the likelihood of the cooling tower effluent from bypassing the individual exchanger packs 210, and therefore the heat exchanger 202, once it exits the evaporative heat transfer media 206. Alternatively, the heat exchanger 202 may include an additional sealing or covering means (not pictured). The sealing means may be in the form of an applied material sealant such as a neoprene and/or silicon sealant, which can be applied to the abutting portions of adjacent exchanger packs 210. The sealing means may alternatively include an additional component or structure such as part of the cooling tower frame structure, disposed between adjacent heat exchanger packs 210. The sealing means may be utilized in combination with the individual exchanger packs 204 to compliment the abutting position of the exchanger packs 210, assisting in preventing the likelihood of the cooling tower effluent from bypassing the heat exchanger pack 210. The individual exchanger packs 210 of the heat exchanger 202 may alternatively be positioned adjacent one another so that gap or space exists between the individual exchanger packs 210. In this embodiment, the sealing or covering means extends between the individual exchanger packs 210 or to assist in preventing the likelihood of the effluent from bypassing the individual exchanger packs 210.

Referring now to FIG. 19, the sectional view of the cooling tower 200 illustrated in FIG. 18 has been rotated 90 degrees to depict the transverse section view of the cooling tower 200. As depicted in FIG. 19, the present invention embodies cooling tower configurations that may include dry air dampers or doors 228, which are disposed on the "dry section" of the cooling tower 200. The dry section of the cooling tower 200 is generally designated 229 and is representative of the portion of the cooling tower 200 that is located above the drift eliminator 222. The cooling tower 200 may also include wet section dampers or doors 230 which are disposed on the "wet section" of the cooling tower 200. The wet section of the cooling tower 200 is generally designated 231 and is representative of the portion of the cooling tower 200 that is located below the drift eliminator 222.

The dry air dampers 228 may be employed only, or in combination with the wet section dampers 230. Similarly, the wet section dampers 230 may be singularly employed or employed in combination with the dry air dampers 228. The dry air dampers 228 and the wet section dampers 230 function to regulate or throttle the flow of air through the cooling tower 200 during cooling tower operation.

During operation of the cooling tower 200, the fan 204 functions to draw in ambient air into the cooling tower 200 simultaneously through the air inlets 214, 224. The ambient air that enters the cooling tower lower air inlets 224 is direct through the evaporative media 226 and may be defined a first air stream, as indicated by the arrows 232. The ambient air that enters the air inlets 214 generates a second air stream, as indicated by arrows 234 that travels through the air ducts 212. Hot liquid or water from the heat source is simultaneously pumped through the hot liquid conduit 218, through the spray heads 220 and sprayed over the evaporative media 226.

While the first air stream 232 travels through the evaporative media 226, the air 232 is heated and moisture is evaporated into the air steam 232. This heated, water laden air 232 or effluent, is then directed through the drift eliminator 222. The effluent 232 then proceeds to enter one of previous described the air flow passages of the heat exchanger packs 210. Meanwhile, as previously described, ambient, dry air 234 enters the air ducts 212 via the inlets 214 to generate the second air stream. The ambient, dry air 234 is then directed through separate air flow passages of the heat exchanger packs 210, preferably perpendicular to the flow of the effluent 232. The ambient, dry air 234 functions to generate a cool surface on the heat exchanger packs 210, allowing heat to transfer from the first air stream 232 to the second air stream 234. The ambient, dry air 234 also provides a cool surface on the heat exchanger packs 210 for water vapor from the effluent 232 or first air stream to condense on. As previously described in connection with the embodiments depicted in FIGS. 1-17, the condensate from the effluent 232 preferably fall from the exchanger packs 210 of the heat exchanger 202 back into the main water collection area of the cooling tower (not pictured). As the two air streams 232, 234 exit the exchanger packs 210 of the heat exchanger 202, they are combined near the fan inlet 236.

During operation, the dry air dampers 228 may be utilized along with the wet section dampers 230 to control the flow of the airstreams 232, 234 through the cooling tower 200. Moreover, the dry air dampers 228 may be closed completely, ceasing flow of ambient air through the air inlets 214 therefore closing off the "cold side" of the heat exchanger packs 210 of the heat exchanger 202.

Figure 20:
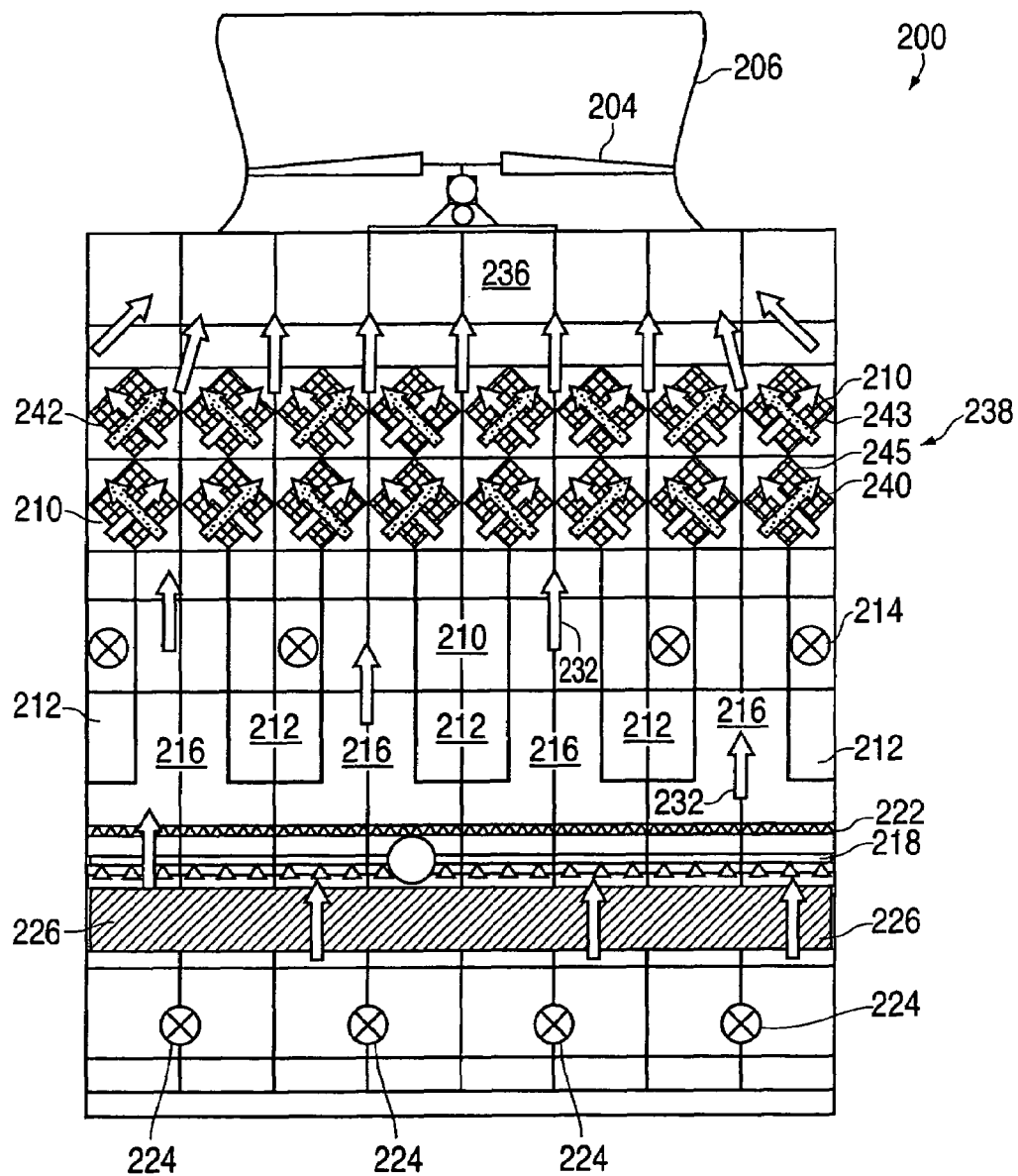
FIG. 20 is a longitudinal section view of a cooling tower in accordance with another alternative embodiment of the present invention.
Figure 21:
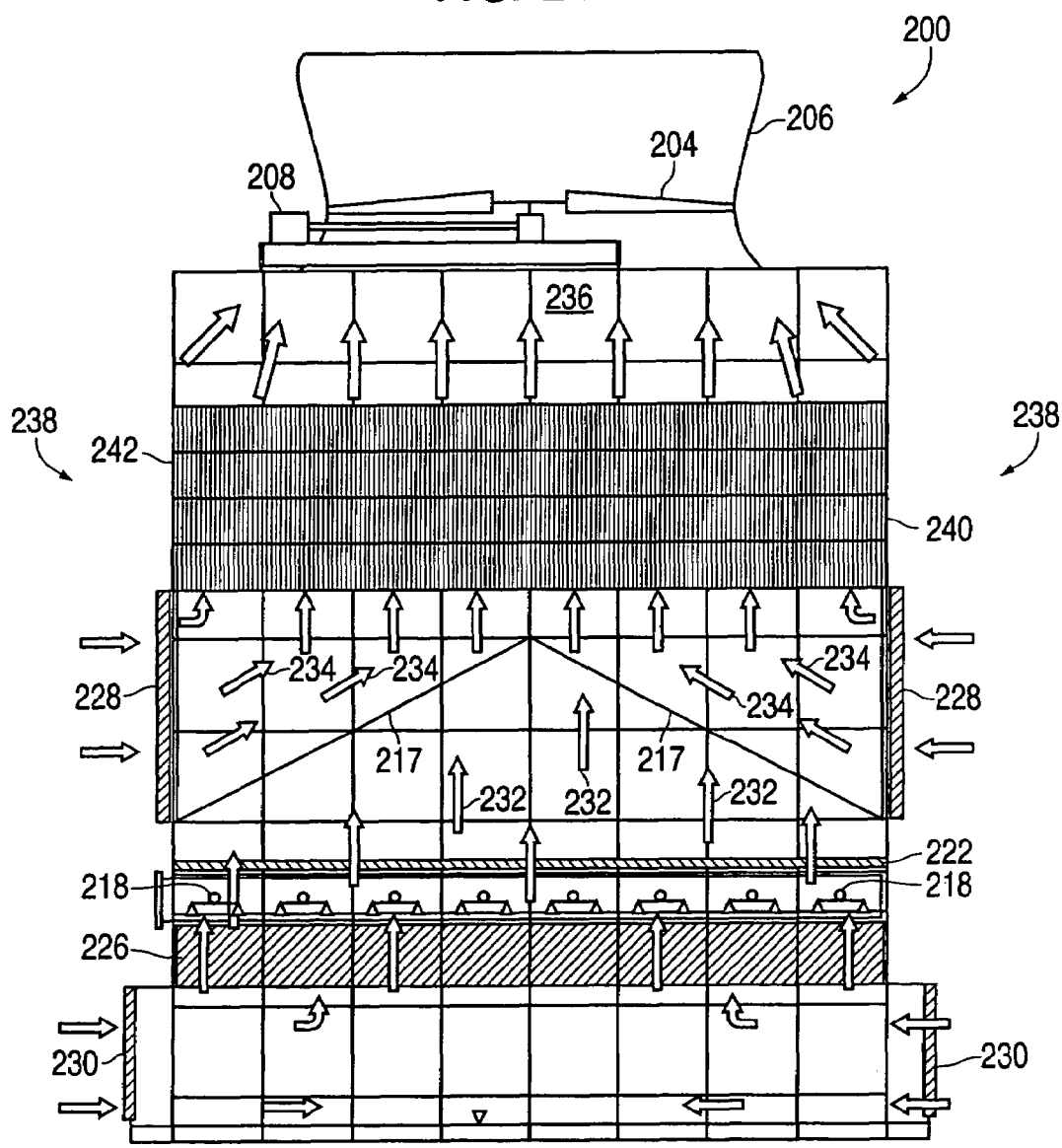
FIG. 21 is a transverse section view of the cooling tower illustrated in FIG. 20.

Referring now to FIGS. 20 and 21, an alternative embodiment of the cooling tower 200 is illustrated, employing a two pass heat exchanger, generally designated 238. As depicted in FIGS. 20 and 21, the two pass heat exchanger 238 includes a first, lower series or tier 240 of heat exchanger packs 210 and a second, complimentary upper series or tier 242 of heat exchanger packs 210 located above the first row 240. The heat exchanger packs 210 of the respective tiers 240, 242 are preferably positioned adjacent to one another in a series abutting one another, so that they extend horizontally across the interior of the cooling tower 200. Furthermore, the vertical positioning of individual heat exchanger packs 210 of the lower tier 240 and the complimentary upper tier 242 is preferably such that portions of the individual heat exchanger packs 210 also abut one another, similar to previously described horizontal positioning of the heat exchanger packs 210. Also, as is apparent from FIGS. 20 and 21, the individual heat exchanger packs 210 of the respective tiers 240, 242, preferably mirror one another. However, the individual heat exchanger packs 210 positioned in the respective tiers 240, 242 may be offset from one another also.

As illustrated in FIGS. 20 and 21, the lower portions 243 of the heat exchanger packs 210 in the upper tier 242 are connected to, or communicate with, the upper portions 245 of the heat exchanger packs located in the lower tier 240. This "communication" provides a single, continuous flow path for the warm, moist air or first air stream as it travels through the first tier 240 of the heat exchanger 238 and transitions to the second tier 242. Similarly, this "communication" provides a single, continuous path for the ambient air or second air stream 234, through the two tiers 240, 242 of the heat exchanger 238, that is separate from the flow path of the first air stream. The lower portions 243 and the upper portions 245 of the heat exchanger packs 210 are can be connected to one another via a sealing means as described above, or they may be connected via mechanical attachment such as bracket, bolt and/or screw. Alternatively, the tiers 240, 242 may be a single, unitary piece.

Moreover, as described in previous embodiments, a sealing means may be utilized between heat exchanger packs 210 positioned horizontally adjacent to one another within a tier 240, 242, and/or between heat exchanger packs positioned vertically adjacent to one another between the tiers 240, 242. Alternatively, the upper and lower tiers, 240, 242 may be spaced a distance apart and the sealing means may be utilized to extend between this gap to prevent the likelihood of effluent bypassing the exchanger packs 210. In the aforementioned embodiment, the air streams 232, 234 pass through two tiers 240, 242 of the heat exchanger packs 210, increasing cooling and condensation of the first air stream. Furthermore, additional tiers (not illustrated) may be added to increase heat exchange and to increase condensate of the first air stream.

Figure 22:
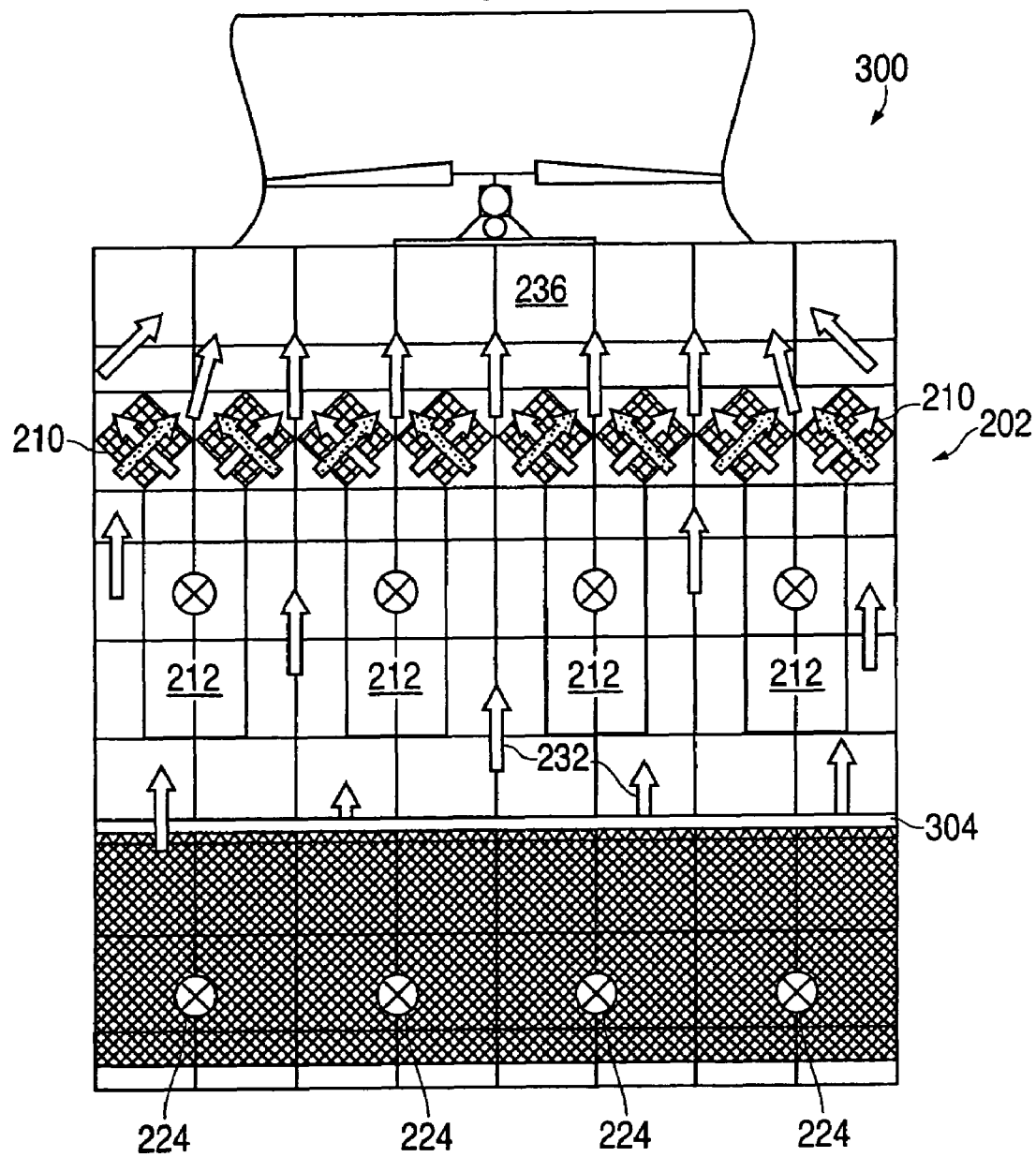
FIG. 22 is a longitudinal section view of a cross-flow cooling tower in accordance with an alternative embodiment of the present invention.
Figure 23:
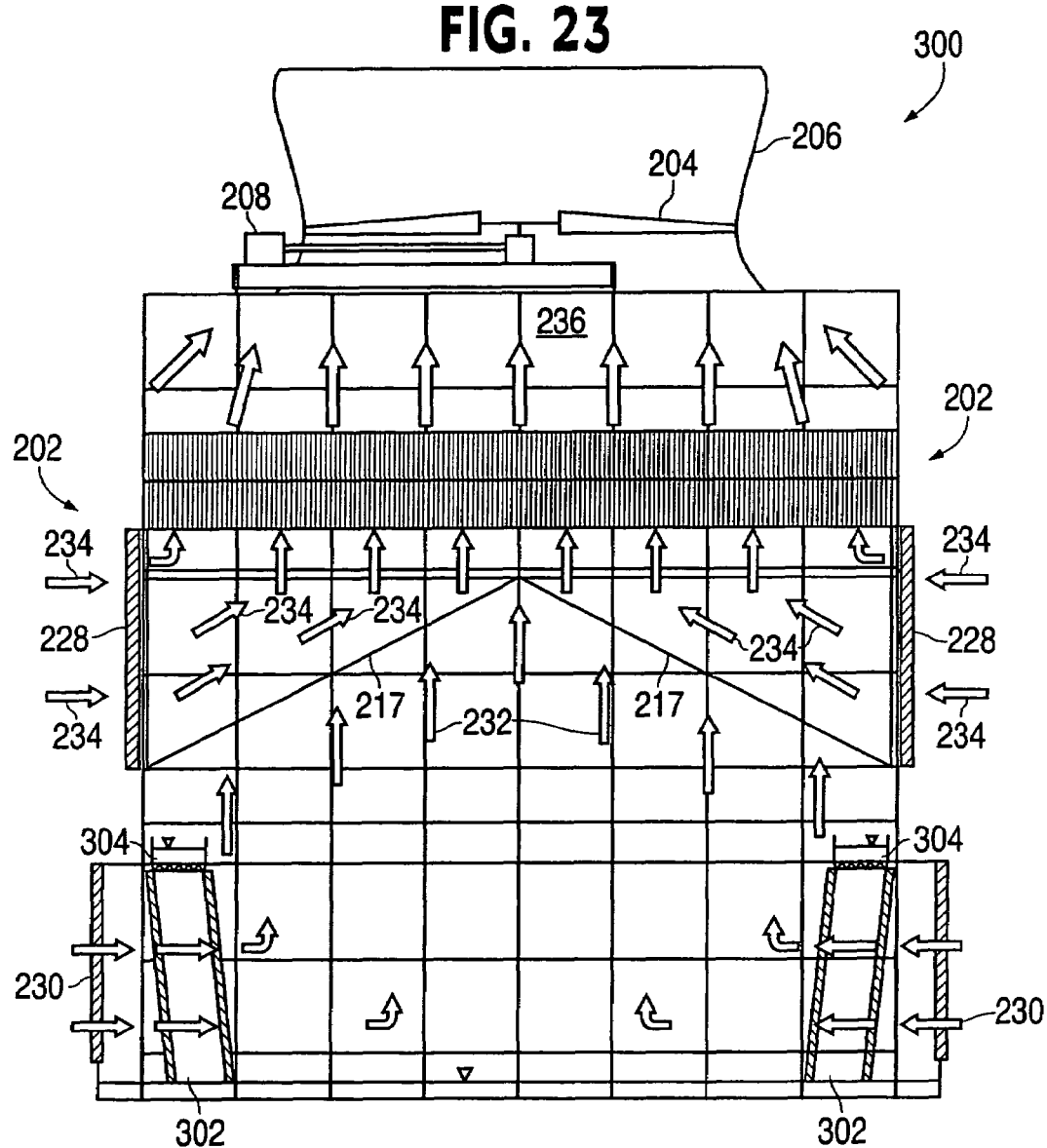
FIG. 23 is a transverse section view of the cross-flow cooling tower illustrated in FIG. 22.

Referring now to FIGS. 22 and 23, a cross-flow cooling tower, generally designated 300, is depicted in accordance with another embodiment of the present invention. Similar to the counter-flow cooling towers illustrated in the previous embodiments, the cross-flow cooling tower 300 employs a heat exchanger 202 having generally diamond shaped exchanger packs 210. As is apparent from FIGS. 22 and 23 and the common reference numerals, the cooling tower 300 includes like elements compared to the previous embodiments. However, the cooling tower 300 alternatively employs heat transfer fill media 302 in the cooling tower "wet section" where evaporative heat transfer occurs, such as film fill media. The cross-flow cooling tower 300 also employs a hot water distribution basin 304 which is located above the transfer fill media 302.

Figure 24:
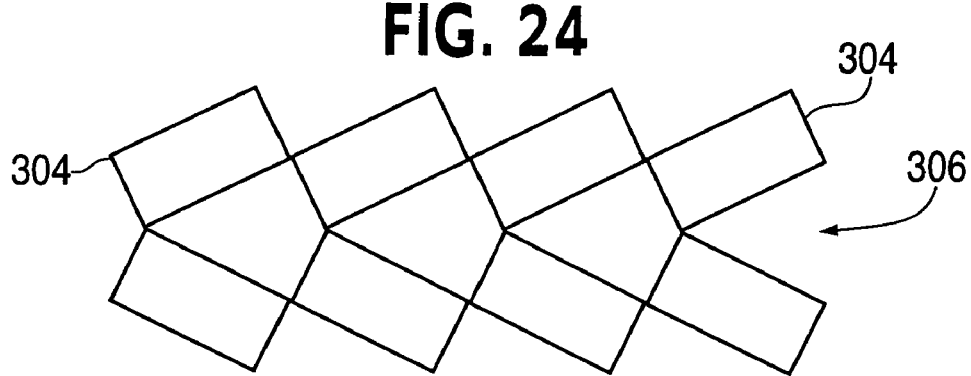
FIG. 24 is a side view of a plurality of heat exchanger packs that may be employed in a heat exchanger in accordance with an alternative embodiment of the present invention.
Figure 25:
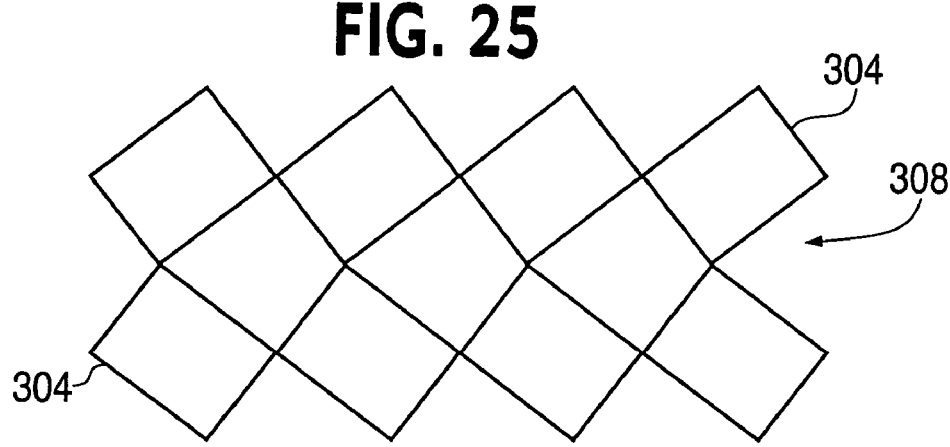
FIG. 25 is a side view of a plurality of heat exchanger packs that may be employed in a heat exchanger in accordance with another alternative embodiment of the present invention.
Figure 26:
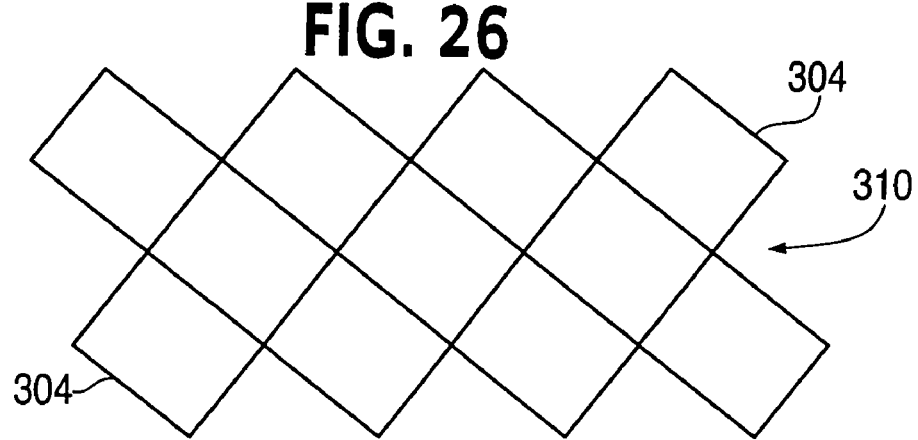
FIG. 26 is a side view of a heat exchanger packs that may be employed in a heat exchanger in accordance with yet another alternative embodiment of the present invention.

Referring now to FIGS. 24-26, a plurality of heat exchanger packs 304, is depicted in varying generally diamond shaped configurations, 306, 308 and 310 respectively, in accordance with an alternative embodiment of the present invention. As illustrated in FIGS. 24-26, the individual heat exchanger packs 304 are non-square in shape or generally rectangular, heat exchanger packs 304 arranged diagonally, point to point, to form the generally diamond shaped configurations 306, 308, 310. While the diamond shaped configurations 306, 308, 310 are illustrated in the two pass orientation as described in the previous embodiments, the diamond shaped configuration 306, 308, 310 may alternatively be employed in the single pass orientation as previously described.

Referring now FIGS. 27-31, a portion of a vapor condensing heat exchanger pack, generally designated 400, is illustrated in accordance with another embodiment of the present invention. Like the previously described embodiments, the heat exchanger pack 400 is constructed from a plurality of individual, thin sheets 402 that are connected or bonded to together to form the pack 400. As illustrated in FIGS. 27-31, the pack 400 has a first flow path 14 and a second flow path 16 for two different air flow streams, similar to the embodiments previously described. In the embodiment depicted, the two air streams enter the heat exchanger pack 400 at right angles to each other and are kept separate from one another by the sheets 402.

As previously described in connection with other embodiments of the invention, the two air streams are prevented from mixing during the heat exchange process by the seal 20, which is formed on the sheet 402 along the first edge, similar to that depicted in the embodiment illustrated in FIG. 2. This seal is formed by raised edges 22 of the sheet 402 that meet in the center of the air passageway 16. This meeting of the edges 22 provides a seal 20 that is raised one-half the width of the passageways 14, similar to the embodiments previously described. As illustrated, the seal 20 extends along the length of the air passageway 14, parallel to the air passageways 16.

Similarly, a seal 24 is formed by the raised edges 26 of the sheet 402, on the edge perpendicular to the seal 20. Like the previously described raised edges 22, the raised edges 26 of seal 24 meet in the center of the air passageway 16 to provide a seal 24 that is raised approximately one-half the width of the passage way 16. The edge of the seal 24 extends the length of the air passageway 16, parallel to the air passageway 14.

Like the embodiments previously discussed, the sheets are relatively thin and are constructed from a synthetic resin material such as polyvinylchloride (PVC). In one preferred embodiment, the sheets 402 preferably have a thickness equal to approximately 0.005 to approximately 0.040 inches. In another preferred embodiment, the sheets 402 have a thickness equal to approximately 0.015 to approximately 0.020 inches.

Figure 27:
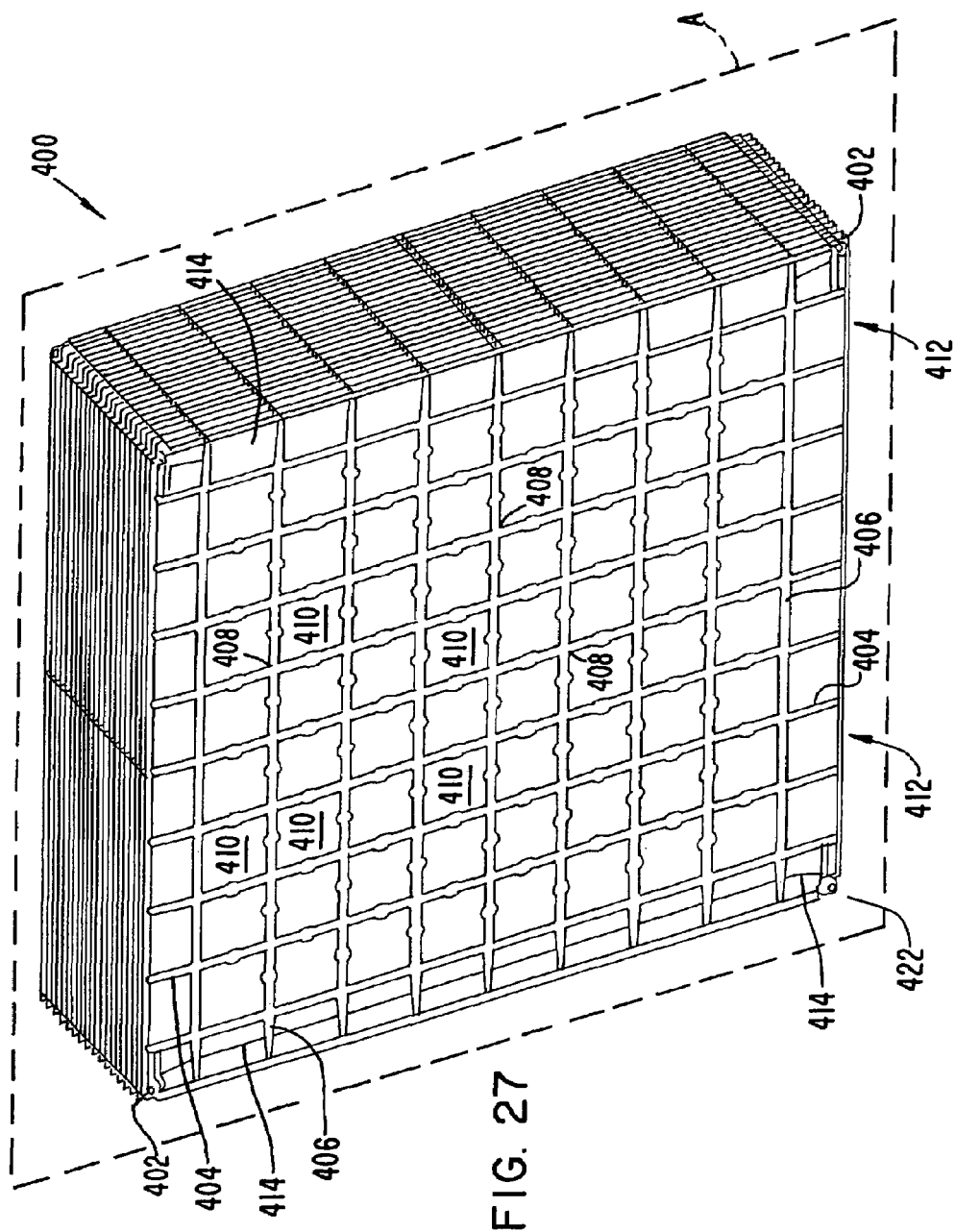
FIG. 27 is a perspective view of a portion of a heat exchanger pack in accordance with an alternative embodiment of the present invention.
Figure 28:
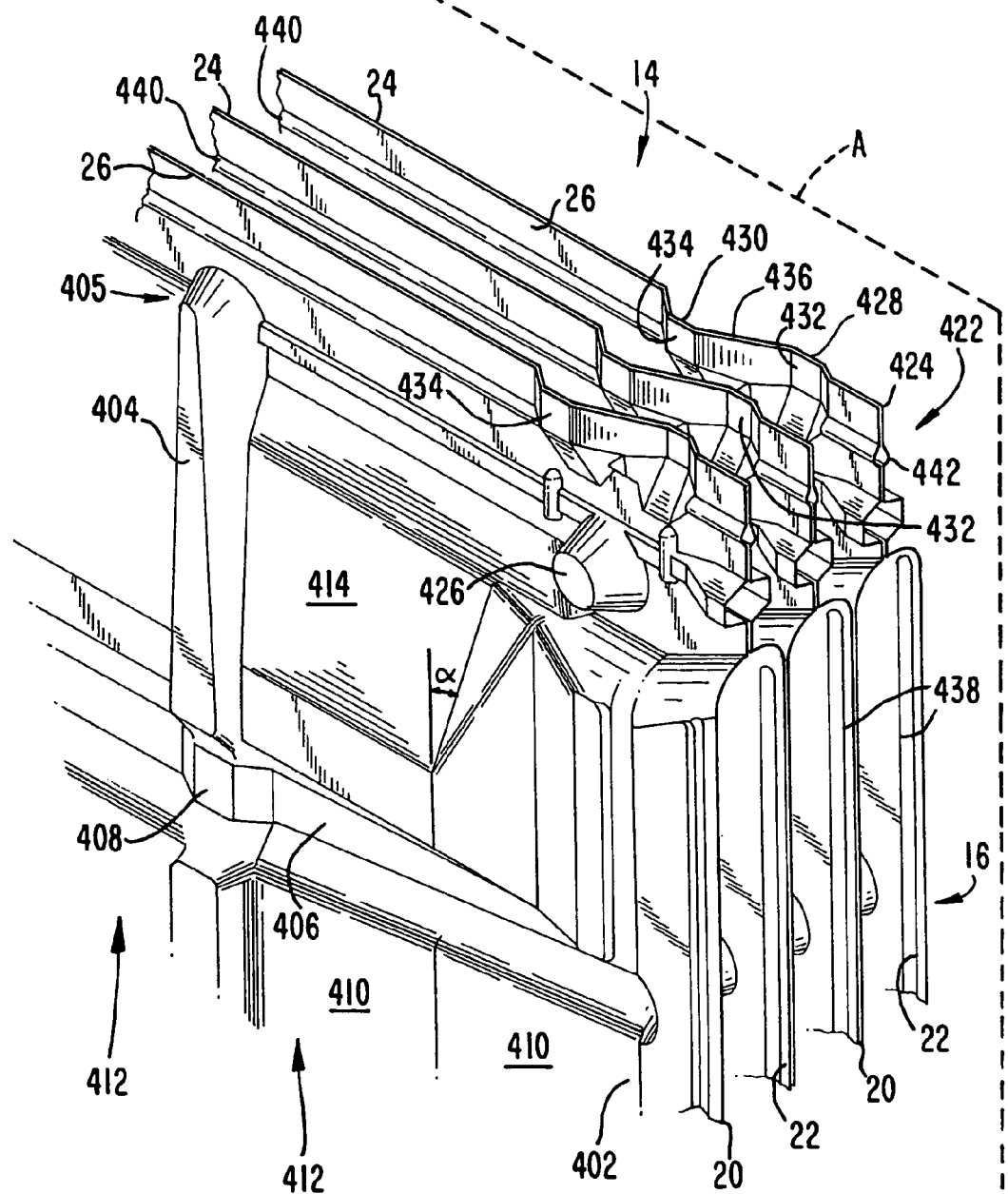
FIG. 28 is a partial perspective view of a portion of a heat exchanger pack in accordance with the embodiment depicted if FIG. 27.

The individual sheets 402 that make up the heat exchanger pack 400 are identical, therefore for descriptive purposes, only one of the sheets 402 will be described herein in detail. As illustrated in FIGS. 27 and 28, the sheets 402 are preferably vacuum formed, resin panels wherein the front sheet 402 extends within a plane A while the adjacent sheets 402 that combine with the front sheet 402 to make the pack 400, also extend parallel to the plane A. As illustrated in FIGS. 27-31, the sheet 402 includes a first series of spaced apart, parallel ribs 404 that extend vertically along the sheet 402, and a second series of space apart, parallel ribs 406 that extend horizontally along the sheet 402. The first series of ribs 404 projects out of the plane A, or out of the page of the drawing, as it extends vertically along the sheet 402 while the second series of ribs 406 project into the plane A, or into the page of the drawing, as it extends horizontally along the sheet 402. As illustrated in FIG. 28, each of the ribs 404, 406 preferably have tapered end regions 405.

As illustrated, the individual sheets of the heat exchanger packs 400 have a alternating configuration wherein adjacent sheets 402 mirror one another. For example, the sheet 402 as illustrated in FIGS. 27-31 may simply be rotated or flipped, in which case, the first series of ribs 404, which project out of plane A, now extend horizontally across the sheet 402 while the second series of ribs 406, which project into the plane A, now extend vertically across the sheet 402. Thus, in the case of a heat exchanger pack, the sheets that are positioned immediately adjacent sheet 402 are identical to sheet 402, but are flipped over.

As depicted in FIGS. 27-31, the ribs 404, 406 are substantially continuous as they extend along the sheet 402 in the horizontal and vertical directions, except for periodic interruptions located where the respective ribs 404, 406 intersect one another. As illustrated in the figures, the first series of ribs 404 and the second serious of ribs 406 intersect one another at preferably a 90 degree angle to another, however the ribs 404, 406 may intersect at angles more or less than 90 degrees if desired. Furthermore, the ribs 404, 406 intersect one another at an intersection point or saddle 408. As illustrated in FIG. 28, the saddle 408 is a depression or dimple region that is disposed on the first series of ribs 404, wherein the saddle gradually projects a distance downward, into the plane A, and then gradually upward out of plane A, to provide a round generally U-shaped depression on saddle 408.

As illustrated in FIGS. 27-31, the saddles 408 are located at each and every point of intersection of the ribs 404, 406. When a stack of sheets are assembled to form a heat exchanger pack, the saddles 408 function as load bearing regions for the adjacent individual sheets 402 and for the heat exchanger pack 400 as a whole. In the embodiments depicted, the saddles transfer various loads the sheets 402 and/or heat exchanger pack 400 may experience during operation, by providing a direct load path through the individual sheets 402 and through the heat exchanger pack 400. The aforementioned orientation of the saddles and the resulting direct load path provides strength and stability to the sheets 402 and the heat exchanger pack 400. For example, in the illustrated embodiment, the saddles are arranged in an array which resists twisting of the pack, bending of the pack, and also resists collapsing of the individual air channels formed between the sheets of the pack. The saddle 408 shape provides an intersection with stiffness in the direction of both ribs. This permits effective load transfer between rib segments in either direction.

As previously described, the first series of ribs 404 extends vertically along the sheets 402 and second series of ribs 406 extends horizontally along the sheets 402 and intersect one another at the saddles 408. These intersections, provide a grid-like configuration on the sheets 402, having a plurality of generally planar sections 410 that are located within the "borders" of the ribs. As illustrated in FIGS. 27-31, the planar sections 410 have a generally square configuration and extend between the vertical ribs 404 and horizontal 406 ribs. The planar sections 410 combine with the vertical ribs 404 to provide adjacent air flow paths or channels 412 for the air streams to pass directly through the heat exchanger pack 400. The aforementioned flow channels 412 also reduce the egress of air from one channel 412 to an adjacent channel 412 and vice versa, and provide single pathway for the air streams to flow through the pack 40 once the streams enter the heat exchanger pack 400. A small amount of air can pass from one channel to another at the saddles.

As discussed above, the planar sections 410 extend between the vertical 404 and horizontal 406 ribs, however the planar sections located on the periphery of each sheet 402, not only extend between ribs 404, 406, but also extend between the horizontal and vertical ribs 404, 406 and the respective edges 22, 24. The peripheral planar sections, as they will be hereinafter called and identified by reference numeral 414, extend to the respective edges 22, 24, are preferably tapered at an angle α to the plane A, as illustrated in FIG. 28. This angle α is preferably equal to approximately 5 degrees to approximately 10 degrees. More preferably the angle α is equal to approximately 7 degrees. The peripheral planar sections 412 and their tapered configuration provide a larger entrance and exit for the air flow of the respective streams through the heat exchanger pack 400. Specifically, the tapered configuration allows the air flow to expand and regain energy as the air streams exit the channels 412, reducing the occurrence of pressure drop as the streams travel through the pack 400 during operation.

Figure 31:
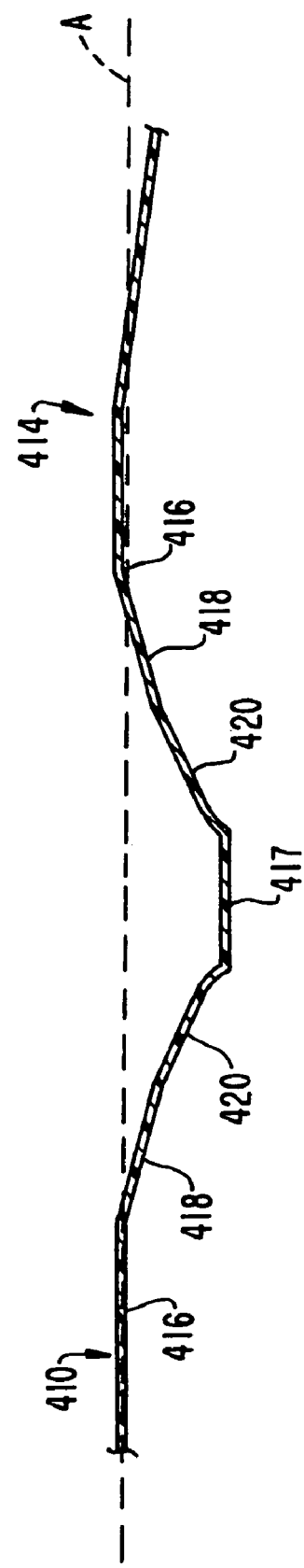
FIG. 31 a cross-sectional view of one of the sheets that makes up the heat exchanger pack depicted in FIGS. 26-30.

Referring now to FIGS. 27-31, the planar sections 410, 414 are generally planar and provide a flat surface in the channels 412 through which the air travels. The flat surface is interrupted by the horizontal ribs 406 that extend inwardly into the plane A, as previously described. As illustrated in FIG. 31, the horizontal ribs 406 include two side walls, each having three sections or regions, a top region 416, a middle regional 418 and a lower region 420. The horizontal ribs 406 also include a base 417 that is located between the two side walls. The top region 416 is preferably oriented at a angle to the plane A equal to approximately 7 degrees while the middle region 418 of the rib 406 is oriented at an angle equal to approximately 30 degrees to the plane A. The bottom region 420 of the rib 406 is preferably oriented at a 45 degree angle to the plane A.

Figure 29:
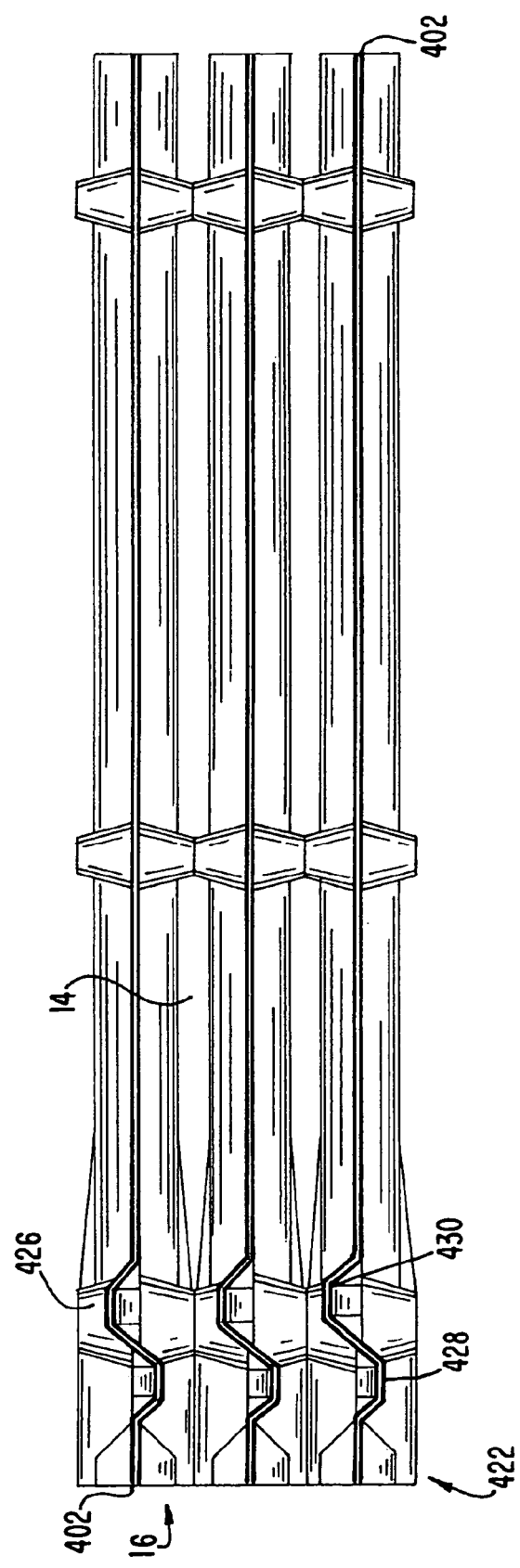
FIG. 29 is an end view of a portion of a heat exchanger pack in accordance with the embodiment of FIG. 27.
Figure 30:
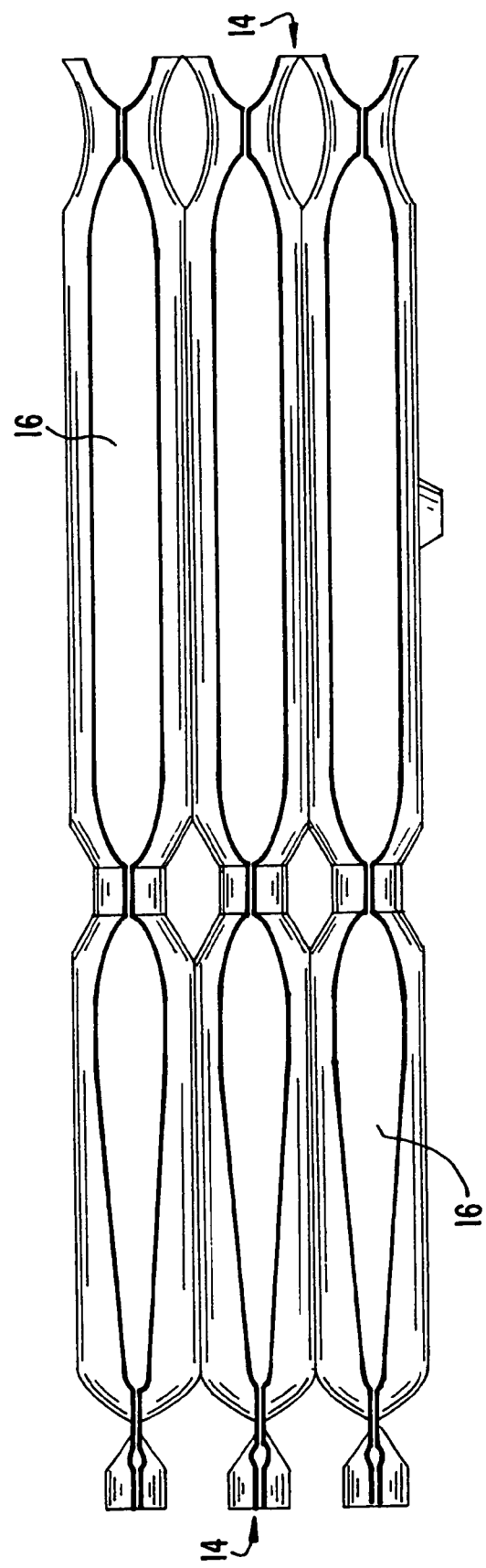
FIG. 30 is another end view of a portion of a heat exchanger pack in accordance with the embodiment of FIG. 27.

Referring now to FIGS. 28 and 29, each sheet 402 of the heat exchanger pack 400 has a four corner regions, each generally designated 422. The corner regions 422 each include a corrugated section or foot 424, along with a cone-shaped feature 426. As illustrated in FIG. 27, the corrugated section 424 a first detent 428 that projects in a first direction, into the plane A, and a second detent 430 adjacent the first detent 428, that projects in a second, opposite direction out of the plane A. More specifically, the first detent 428 includes a bottom wall 432 below the plane A, while the second detent includes a top wall 434 located above the plane A. Furthermore, as illustrated in FIGS. 28 and 29, both detents 428, 430 share an angled wall 436 that connects both detents 428, 430. The foot 424 due to its above-described configuration provides a moment resistant region that supports the individual sheets 402 and the heat exchanger packs 400.

During operation, the foot allows the individual fill packs to easily engage the support structure or frame assembly of the cooling tower within which the heat exchanger is employed. The support structure or frame assembly of the typically include cross beams or supports having generally planar surfaces upon with the individual heat exchanger packs sit or rest. The aforementioned corrugated configuration of the foot, the first detent 428 that projects in the first direction, and a second detent 430 adjacent the first detent 428, that projects in the second, opposite direction out of the plane A, provides a stiff, generally planar support surface that easily rests on, or engages, the planar surface of the cross beams or supports of the cooling tower.

FIGS. 27-31 also include a first edge rib 438 and a second edge rib 440. The first edge rib 438 extends along the first edge of sheet, parallel to the seal 20 and therefore parallel to the air passageways 16. The second edge rib 440 extends along the second edge of the sheet, parallel to seal 24. As illustrated in FIG. 27, the first edge rib 438 intersects the corrugated section 424. The first edge also includes a corner rib 442 that extends parallel to the first edge rib 438, however while the first edge rib 438 extends the entire length of the first edge, the corner rib 442 only extends the length of the peripheral planar region 414 upon which it is disposed.

The subtle geometry and configuration of the individual sheets 402, as described above in connection with the FIGS. 27-31, provide a heat exchanger pack 400 with improved thermal performance along with improved structural performance. By subtle geometry or configuration, it is understood that the individual sheets 402 preferably include only soft angles, jogs and cones and do not contain any steep angles, greater than 45 degrees, for example. The subtle geometry not only helps with the thermal performance of the heat exchanger packs 400, but helps prevent the negative nesting, or the premature nesting, of the sheets prior to being placed into proper position, and allows the sheets 402 to slide easily into operational position and lock into place.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A sheet having first, second, third and fourth edges along with first, second, third and fourth corners, for use with a heat exchange apparatus having a vertical axis, wherein the sheet generally lies in a plane that is generally parallel to the vertical axis, comprising:

a first vertical rib that extends in a first direction generally parallel to the vertical axis along the sheet, substantially all the way between the first and second edges, wherein said first vertical rib protrudes in a second direction out of the plane;

a second vertical rib that extends in the first direction along the sheet, substantially all the way between the first and second edges generally parallel to said first vertical rib, wherein said second vertical rib protrudes in the second direction out of the plane;

a first horizontal rib that extends in a third direction along the sheet substantially all the way between the third and fourth edges, wherein said first horizontal rib protrudes in a fourth direction opposite said second direction, into the plane, wherein said first horizontal rib intersects said first vertical rib;

a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, a first foot located at the first corner, wherein said first foot comprises a first detent that protrudes in the second direction out of the plane, a second detent located adjacent said first detent, wherein said second detent protrudes in the fourth direction into the plane;

a second foot located at the second corner, wherein said second foot comprises a third detent that protrudes in the second direction out of the plane, a fourth detent located adjacent said third detent, wherein said fourth detent protrudes in the fourth direction into the plane;

a third foot located at the third corner, wherein said third foot comprises a fifth detent that protrudes in the second direction out of the plane, a sixth detent located adjacent said fifth detent, wherein said sixth detent protrudes in the fourth direction into the plane, and a fourth foot located at the fourth corner, wherein said fourth foot comprises a seventh detent that protrudes in the second direction out of the plane, a eighth detent located adjacent said seventh detent, wherein said eighth detent protrudes in the fourth direction into the plane, wherein said first and second vertical ribs and said first and second horizontal ribs form a boundary that surrounds at least one generally planar region.

2. The sheet according to claim 1, further comprising a saddle region located at each of the intersections between said first vertical and horizontal ribs and said second vertical and horizontal ribs, wherein said saddle regions transfer loads.

3. A sheet having first, second, third and fourth edges along with first, second, third and fourth corners, for use with a heat exchange apparatus having a vertical axis, wherein the sheet generally lies in a plane that is generally parallel to the vertical axis, comprising:

a first vertical rib that extends in a first direction generally parallel to the vertical axis along the sheet, substantially all the way between the first and second edges, wherein said first vertical rib protrudes in a second direction out of the plane;

a second vertical rib that extends in the first direction along the sheet, substantially all the way between the first and second edges generally parallel to said first vertical rib, wherein said second vertical rib protrudes in the second direction out of the plane;

a first horizontal rib that extends in a third direction along the sheet substantially all the way between the third and fourth edges, wherein said first horizontal rib protrudes in a fourth direction opposite said second direction, into the plane, wherein said first horizontal rib intersects said first vertical rib; and a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region and wherein said at least one generally planar region is oriented at an angle to the plane equal to approximately 5 degrees to approximately 10 degrees.

4. The sheet according to claim 3, wherein said angle is equal to approximately 7 degrees.

5. A sheet having first, second, third and fourth edges along with first, second, third and fourth corners, for use with a heat exchange apparatus having a vertical axis, wherein the sheet generally lies in a plane that is generally parallel to the vertical axis, comprising:

a first vertical rib that extends in a first direction generally parallel to the vertical axis along the sheet, substantially all the way between the first and second edges, wherein said first vertical rib protrudes in a second direction out of the plane;

a second vertical rib that extends in the first direction along the sheet, substantially all the way between the first and second edges generally parallel to said first vertical rib, wherein said second vertical rib protrudes in the second direction out of the plane;

a first horizontal rib that extends in a third direction along the sheet substantially all the way between the third and fourth edges, wherein said first horizontal rib protrudes in a fourth direction opposite said second direction, into the plane, wherein said first horizontal rib intersects said first vertical rib; and a second horizontal rib that extends in the third direction along the sheet substantially all the way between the third and fourth edges generally parallel to said first horizontal rib, wherein said second horizontal rib protrudes in the fourth direction opposite said second direction, into the plane, wherein said second horizontal rib intersects said second vertical rib, wherein said first and second vertical ribs and said first and second horizontal ribs form a boundary that surrounds at least one generally planar region and wherein said first horizontal rib and said second horizontal rib each comprise:

a first wall having a top region, a middle region and a lower region;

a second wall having a top region, a middle region and a lower region; and a base that extends between said first wall and said second wall, wherein each of the top regions are oriented at an angle to the plane equal to approximately 12 degrees.

6. The sheet according to claim 1, wherein each of the middle regions are oriented at an angle to the plane equal to approximately 30 degrees.

7. The sheet according to claim 6, wherein each of the lower regions are oriented at an angle to the plane equal to approximately 45 degrees.

8. The sheet according to claim 1, wherein said sheet is made of polyvinyl chloride (PVC).

9. A sheet having first, second, third and fourth edges along with first, second, third and fourth corners, for use with a heat exchange apparatus having a vertical axis, wherein the sheet generally lies in a plane that is generally parallel to the vertical axis, comprising:

a first foot located at the first corner, wherein said first foot comprises a first detent that protrudes in a first direction out of the plane, a second detent located adjacent said first detent, wherein said second detent protrudes in a second direction into the plane, wherein said first foot further comprises a first cone shaped knob;

a second foot located at the second corner, wherein said second foot comprises a third detent that protrudes in the first direction out of the plane, a fourth detent located adjacent said third detent, wherein said fourth detent protrudes in the second direction into the plane, wherein said second foot further comprises a second cone shaped knob;

a third foot located at the third corner, wherein said third foot comprises a fifth detent that protrudes in the first direction out of the plane, a sixth detent located adjacent said fifth detent, wherein said sixth detent protrudes in the second direction into the plane, wherein said third foot further comprises a third cone shaped knob;

a fourth foot located at the fourth corner, wherein said fourth foot comprises a seventh detent that protrudes in the first direction out of the plane, a eighth detent located adjacent said seventh detent, wherein said eighth detent protrudes in the second direction into the plane, wherein said fourth foot further comprises a fourth cone shaped knob a first vertical rib that extends in a third direction generally parallel to the vertical axis along the sheet, substantially all the way between the first and second edges, wherein said first vertical rib protrudes in the first direction out of the plane;

a second vertical rib that extends in the third direction along the sheet, substantially all the way between the first and second edges generally parallel to said first vertical rib, wherein said second vertical rib protrudes in the first direction out of the plane;

a first horizontal rib that extends in a fourth direction along the sheet substantially all the way between the third and fourth edges, wherein said first horizontal rib protrudes in the second direction, into the plane, wherein said first horizontal rib intersects said first vertical rib; and a second horizontal rib that extends in the fourth direction along the sheet substantially all the way between the third and fourth edges generally parallel to said first horizontal rib, wherein said second horizontal rib protrudes in the second direction into the plane, wherein said second horizontal rib intersects said second vertical rib, wherein said first and second vertical ribs and said first and second horizontal ribs form a boundary that surrounds at least one generally planar region.

10. The sheet according to claim 9, further comprising saddle region located at each of the intersections between said first vertical and first horizontal ribs and said second vertical and second horizontal ribs, wherein said saddle regions transfer loads.

11. The sheet according to claim 9, wherein said at least one generally planar region is oriented at an angle to the plane equal to approximately 5 degrees to approximately 10 degrees.

12. The sheet according to claim 11, wherein said angle is equal to approximately 7 degrees.

13. The sheet according to claim 9, wherein said first horizontal rib and said second horizontal rib each comprise:

a first wall having a top region, a middle region and a lower region;

a second wall having a top region, a middle region and a lower region; and a base that extends between said first wall and said second wall.

14. The sheet according to claim 13, wherein each of the top regions are oriented at an angle to the plane equal to approximately 12 degrees.

15. The sheet according to claim 14, wherein each of the middle regions are oriented at an angle to the plane equal to approximately 30 degrees.

16. The sheet according to claim 15, wherein each of the lower regions are oriented at an angle to the plane equal to approximately 45 degrees.

17. The sheet according to claim 9, wherein said sheet is made of polyvinyl chloride (PVC).

18. A heat exchanger pack for use with a heat exchange apparatus having a vertical axis, comprising:

a first sheet that generally lies in a plane and a second sheet that lies generally parallel to the plane, said first sheet and said second sheet each comprising:

a first edge, a second edge, a third edge and a fourth edge;

a first vertical rib that extends in a first direction generally parallel to the vertical axis along the sheet, substantially all the way between the first and second edges, wherein said first vertical rib protrudes in a second direction out of the plane;

a second vertical rib that extends in the first direction along the sheet substantially all the way between the first and second edges generally parallel to said first vertical rib, wherein said second vertical rib protrudes in the second direction out of the plane;

a first horizontal rib that extends in a third direction along the sheet substantially all the way between the third and fourth edges, wherein said first horizontal rib protrudes in a fourth direction opposite said second direction, into the plane, wherein said first horizontal rib intersects said first vertical rib;

a second horizontal rib that extends in the third direction along the sheet substantially all the way between the third and fourth edges generally parallel to the first horizontal rib, wherein said second horizontal rib protrudes in a fourth direction opposite the second direction, into the plane, wherein said second horizontal rib intersects said second vertical rib a first foot located at the first corner, wherein said first foot comprises a first detent that protrudes in said second direction out of the plane, a second detent located adjacent said first detent, wherein said second detent protrudes in said fourth direction into the plane;

a second foot located at the second corner, wherein said second foot comprises a third detent that protrudes in said second direction out of the plane, a fourth detent located adjacent said third detent, wherein said fourth detent protrudes in said fourth direction into the plane;

a third foot located at the third corner, wherein said third foot comprises a fifth detent that protrudes in said second direction out of the plane, a sixth detent located adjacent said fifth detent, wherein said sixth detent protrudes in said fourth direction into the plane; and a fourth foot located at the fourth corner, wherein said fourth foot comprises a seventh detent that protrudes in said second direction out of the plane, a eighth detent located adjacent said seventh detent, wherein said eighth detent protrudes in said fourth direction into the plane wherein said first and second vertical ribs and said first and second horizontal ribs form a boundary that surrounds at least one generally planar region.

19. The heat exchanger pack according to claim 18, further comprising a saddle region located at each of the intersections between the first vertical and first horizontal ribs and the second vertical and second horizontal ribs, wherein said saddle regions transfer loads.

20. The sheet according to claim 18, wherein said first foot further comprises a first cone shaped knob; said second foot further comprises a second cone shaped knob; said third foot further comprises a third cone shaped knob; and wherein said fourth foot further comprises a fourth cone shaped knob.

21. A heat exchanger pack for use with a heat exchange apparatus having a vertical axis, comprising:
   a first sheet that generally lies in a plane and a second sheet that lies generally parallel to the plane, said first sheet and said second sheet each comprising:
      a first edge, a second edge, a third edge and a fourth edge;
      a first vertical rib that extends in a first direction generally parallel to the vertical axis along the sheet, substantially all the way between the first and second edges, wherein said first vertical rib protrudes in a second direction out of the plane;
      a second vertical rib that extends in the first direction along the sheet substantially all the way between the first and second edges generally parallel to said first vertical rib, wherein said second vertical rib protrudes in the second direction out of the plane;
      a first horizontal rib that extends in a third direction along the sheet substantially all the way between the third and fourth edges, wherein said first horizontal rib protrudes in a fourth direction opposite said second direction, into the plane, wherein said first horizontal rib intersects said first vertical rib;
      a second horizontal rib that extends in the third direction along the sheet substantially all the way between the third and fourth edges generally parallel to the first horizontal rib, wherein said second horizontal rib protrudes in a fourth direction opposite the second direction, into the plane, wherein said second horizontal rib intersects said second vertical rib,
   wherein said first and second vertical ribs and said first and second horizontal ribs form a boundary that surrounds at least one generally planar region, herein said at least one generally planar region is oriented at an angle to the plane equal to approximately 5 degrees to approximately 10 degrees.

22. The sheet according to claim 21, wherein said angle is equal to approximately 7 degrees.

23. A heat exchanger pack for use with a heat exchange apparatus having a vertical axis, comprising:
   a first sheet that generally lies in a plane and a second sheet that lies generally parallel to the plane, said first sheet and said second sheet each comprising:
      a first edge, a second edge, a third edge and a fourth edge;
      a first vertical rib that extends in a first direction generally parallel to the vertical axis along the sheet, substantially all the way between the first and second edges, wherein said first vertical rib protrudes in a second direction out of the plane;
      a second vertical rib that extends in the first direction along the sheet substantially all the way between the first and second edges generally parallel to said first vertical rib, wherein said second vertical rib protrudes in the second direction out of the plane;
      a first horizontal rib that extends in a third direction along the sheet substantially all the way between the third and fourth edges, wherein said first horizontal rib protrudes in a fourth direction opposite said second direction, into the plane, wherein said first horizontal rib intersects said first vertical rib; and
      a second horizontal rib that extends in the third direction along the sheet substantially all the way between the third and fourth edges generally parallel to the first horizontal rib, wherein said second horizontal rib protrudes in a fourth direction opposite the second direction, into the plane, wherein said second horizontal rib intersects said second vertical rib,
   wherein said first and second vertical ribs and said first and second horizontal ribs form a boundary that surrounds at least one generally planar region and wherein said first horizontal rib and said second horizontal rib each comprise:
   a first wall having a top region, a middle region and a lower region;
   a second wall having a top region, a middle region and a lower region; and
   a base that extends between said first wall and said second wall,
   wherein each of the top regions are oriented at an angle to the plane equal to approximately 12 degrees.

24. The sheet according to claim 23, wherein each of the middle regions are oriented at an angle to the plane equal to approximately 30 degrees.

25. The sheet according to claim 23, wherein each of the lower regions are oriented at an angle to the plane equal to approximately 45 degrees.

* * * * *